United States Patent
Kim et al.

(10) Patent No.: US 10,440,903 B2
(45) Date of Patent: *Oct. 15, 2019

(54) DRIP LINE EMITTER AND METHODS RELATING TO SAME

(71) Applicant: Rain Bird Corporation, Azusa, CA (US)

(72) Inventors: Jae Yung Kim, Los Angeles, CA (US); Mark Richard Edris, Glendora, CA (US); Mark M. Ensworth, Orange, CA (US); Michael Leo Donoghue, Tucson, AZ (US); Samir Shah, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/036,881

(22) Filed: Sep. 25, 2013

(65) Prior Publication Data

US 2014/0027539 A1 Jan. 30, 2014

Related U.S. Application Data

(63) Continuation-in-part of application No. 13/430,308, filed on Mar. 26, 2012.

(51) Int. Cl.
*A01G 25/02* (2006.01)
*B29D 23/00* (2006.01)

(52) U.S. Cl.
CPC ......... *A01G 25/023* (2013.01); *A01G 25/026* (2013.01); *B29D 23/00* (2013.01); *B29D 23/001* (2013.01)

(58) Field of Classification Search
CPC ............................ A01G 25/023; A01G 25/026
(Continued)

(56) References Cited

U.S. PATENT DOCUMENTS 2,174,515 A 10/1939 Hughes
2,449,731 A 9/1948 Therrien
(Continued)

FOREIGN PATENT DOCUMENTS

AU 511876 10/1978
AU 2004208646 3/2006
(Continued)

OTHER PUBLICATIONS

Patent Cooperation Treaty, International Searching Authority, Notification of Transmittal of the International Search Report and the Written Opinion of the International Searching Authority, or the Declaration, issued in International Application No. PCT/US/2014/054533, Dec. 25, 2014, 9 pp.

(Continued)

*Primary Examiner* — Alexander M Valvis
(74) *Attorney, Agent, or Firm* — Fitch, Even, Tabin & Flannery LLP

(57) ABSTRACT

An irrigation emitter and drip line, and methods relating to same, are provided for reducing the flow and pressure of fluid via an emitter or plurality of emitters defined by two concentric tubes. In one form, the first tube defines an emitter inlet and connected pressure-reducing flow channel and the second tube is extruded over the first tube to enclose the emitter inlet and flow channel and defines an outlet connected to an end of the flow channel opposite the inlet to create an emitter for converting fluid flowing at a high flow rate in the lumen and at the first end of the inlet to a fluid with a low flow rate at the outlet of the emitter. In another form, a drip line is provided having a plurality of such emitters. The emitters capable of being provided with pressure compensation structures to compensate or account for fluctuations in supply line fluid pressure and root growth (Continued)

inhibiting members. Various methods related to the emitter and drip line are also disclosed.

26 Claims, 13 Drawing Sheets

(58) Field of Classification Search
USPC .................................................. 239/542, 547
See application file for complete search history.

(56) References Cited

U.S. PATENT DOCUMENTS

| | | | |
|---|---|---|---|
| 2,508,403 A | 5/1950 | Knauss |
| 2,625,429 A | 1/1953 | Coles |
| 2,639,194 A | 5/1953 | Wahlin |
| 2,683,061 A | 7/1954 | Shahnazarian |
| 2,762,397 A | 9/1956 | Miller |
| 2,794,321 A | 6/1957 | Warner |
| 2,873,030 A | 2/1959 | Ashton |
| 2,970,923 A | 2/1961 | Sparmann |
| 3,004,330 A | 10/1961 | Wilkins |
| 3,155,612 A | 11/1964 | Weber |
| 3,182,916 A | 5/1965 | Schulz |
| 3,199,901 A | 8/1965 | Jeppsson |
| 3,302,450 A | 2/1967 | Wakar |
| 3,323,550 A | 6/1967 | Lee |
| 3,361,359 A | 1/1968 | Chapin |
| 3,420,064 A | 1/1969 | Blass |
| 3,426,544 A | 2/1969 | Curtis |
| 3,434,500 A | 3/1969 | Burrows |
| 3,467,142 A | 9/1969 | Donn |
| 3,586,291 A | 6/1971 | Malec |
| 3,672,571 A | 6/1972 | Goodricke |
| 3,693,888 A | 9/1972 | Christy |
| 3,697,002 A | 10/1972 | Parkison |
| 3,698,195 A | 10/1972 | Chapin |
| 3,719,327 A | 3/1973 | McMahan |
| 3,727,635 A | 4/1973 | Todd |
| 3,729,142 A | 4/1973 | Leal |
| 3,753,527 A | 8/1973 | Galbraith |
| 3,777,980 A | 12/1973 | Allport |
| 3,777,987 A | 12/1973 | Allport |
| 3,779,468 A | 12/1973 | Spencer |
| 3,780,946 A | 12/1973 | Bowen |
| 3,791,587 A | 2/1974 | Drori |
| 3,792,588 A | 2/1974 | Gilaad |
| 3,797,741 A | 3/1974 | Spencer |
| 3,804,334 A | 4/1974 | Curry |
| 3,807,430 A | 4/1974 | Keller |
| 3,814,377 A | 6/1974 | Todd |
| 3,815,636 A | 6/1974 | Menzel |
| RE28,095 E | 7/1974 | Chapin |
| 3,833,019 A | 9/1974 | Diggs |
| 3,851,896 A | 12/1974 | Olson |
| 3,856,333 A | 12/1974 | Cox |
| 3,863,845 A | 2/1975 | Bumpstead |
| 3,866,833 A | 2/1975 | Shibata et al. |
| 3,870,236 A | 3/1975 | Sahagun-Barragan |
| 3,873,030 A | 3/1975 | Barragan |
| 3,874,598 A | 4/1975 | Havens |
| 3,882,892 A | 5/1975 | Menzel |
| 3,885,743 A | 5/1975 | Wake |
| 3,895,085 A | 7/1975 | Hiroshi |
| 3,896,999 A | 7/1975 | Barragan |
| 3,903,929 A | 9/1975 | Mock |
| 3,940,066 A | 2/1976 | Hunter |
| 3,948,285 A | 4/1976 | Flynn |
| 3,954,223 A | 5/1976 | Wichman |
| 3,957,292 A | 5/1976 | Diggs |
| 3,966,233 A | 6/1976 | Diggs |
| 3,970,251 A | 7/1976 | Harmony |
| 3,973,732 A | 8/1976 | Diggs |
| 3,981,452 A | 9/1976 | Eckstein |
| 3,993,248 A | 11/1976 | Harmony |
| 3,995,436 A | 12/1976 | Diggs |
| 3,998,244 A | 12/1976 | Bentley |
| 3,998,391 A | 12/1976 | Lemelshtrich |
| 3,998,427 A | 12/1976 | Bentley |
| 4,008,853 A | 2/1977 | Tregillus |
| 4,017,958 A | 4/1977 | Diggs |
| 4,022,384 A | 5/1977 | Hoyle |
| 4,036,435 A | 7/1977 | Pecaro |
| 4,037,791 A | 7/1977 | Mullett |
| 4,047,995 A | 9/1977 | Leal-Diaz |
| 4,054,152 A | 10/1977 | Ito |
| 4,058,257 A | 11/1977 | Spencer |
| 4,059,228 A | 11/1977 | Werner |
| 4,077,570 A | 3/1978 | Harmony |
| 4,077,571 A | 3/1978 | Harmony |
| 4,084,749 A | 4/1978 | Drori |
| 4,092,002 A | 5/1978 | Grosse |
| 4,095,750 A | 6/1978 | Gilead |
| 4,105,162 A | 8/1978 | Drori |
| 4,121,771 A | 10/1978 | Hendrickson |
| 4,122,590 A | 10/1978 | Spencer |
| 4,132,364 A | 1/1979 | Harmony |
| 4,134,550 A | 1/1979 | Bright |
| 4,143,820 A | 3/1979 | Bright |
| 4,160,323 A | 7/1979 | Tracy |
| 4,161,291 A | 7/1979 | Bentley |
| 4,177,946 A | 12/1979 | Sahagun-Barragan |
| 4,177,947 A | 12/1979 | Menzel |
| 4,196,753 A | 4/1980 | Hammarstedt |
| 4,196,853 A | 4/1980 | Delmer |
| 4,209,133 A | 6/1980 | Mehoudar |
| 4,210,287 A | 7/1980 | Mehoudar |
| 4,223,838 A | 9/1980 | Maria-Vittorio-Torrisi |
| 4,225,307 A | 9/1980 | Magera |
| 4,226,368 A | 10/1980 | Hunter |
| 4,235,380 A | 11/1980 | Delmer |
| 4,247,051 A | 1/1981 | Allport |
| 4,250,915 A | 2/1981 | Rikuta |
| 4,273,286 A | 6/1981 | Menzel |
| 4,274,597 A | 6/1981 | Dobos |
| 4,281,798 A | 8/1981 | Lemelstrich |
| 4,307,841 A | 12/1981 | Mehoudar |
| 4,331,293 A | 5/1982 | Rangel-Garza |
| 4,344,576 A | 8/1982 | Smith |
| 4,354,639 A | 10/1982 | Delmer |
| 4,366,926 A | 1/1983 | Mehoudar |
| 4,369,923 A | 1/1983 | Bron |
| 4,384,680 A | 5/1983 | Mehoudar |
| 4,385,727 A | 5/1983 | Spencer |
| 4,385,757 A | 5/1983 | Muller |
| 4,392,616 A | 7/1983 | Olson |
| 4,413,786 A | 11/1983 | Mehoudar |
| 4,413,787 A | 11/1983 | Gilead |
| 4,423,838 A | 1/1984 | Dinur |
| 4,424,936 A | 1/1984 | Marc |
| 4,430,020 A | 2/1984 | Robbins |
| 4,460,129 A | 7/1984 | Olson |
| 4,473,191 A | 9/1984 | Chapin |
| 4,473,525 A | 9/1984 | Drori |
| 4,502,631 A | 3/1985 | Christen |
| 4,508,140 A | 4/1985 | Harrison |
| 4,513,777 A | 4/1985 | Wright |
| 4,519,546 A | 5/1985 | Gorney |
| 4,522,339 A | 6/1985 | Costa |
| 4,533,083 A | 8/1985 | Tucker |
| 4,534,515 A | 8/1985 | Chapin |
| 4,545,784 A | 10/1985 | Sanderson |
| 4,572,756 A | 2/1986 | Chapin |
| 4,573,640 A | 3/1986 | Mehoudar |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |

(56) References Cited

U.S. PATENT DOCUMENTS

| | | |
|---|---|---|
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |
| 4,756,339 A | 7/1988 | Buluschek |
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli |
| 4,824,019 A | 4/1989 | Lew |
| 4,824,025 A | 4/1989 | Miller |
| 4,850,531 A | 7/1989 | Littleton |
| 4,854,158 A | 8/1989 | Gates |
| 4,856,552 A | 8/1989 | Hiemstra |
| 4,859,264 A | 8/1989 | Buluschek |
| 4,862,731 A | 9/1989 | Gates |
| 4,874,132 A | 10/1989 | Gilead |
| 4,880,167 A | 11/1989 | Langa |
| 4,900,437 A | 2/1990 | Savall |
| 4,909,411 A | 3/1990 | Uchida |
| 4,948,295 A | 8/1990 | Pramsoler |
| 4,984,739 A | 1/1991 | Allport |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,111,995 A | 5/1992 | Dumitrascu et al. |
| 5,111,996 A | 5/1992 | Eckstein |
| 5,116,414 A | 5/1992 | Burton |
| 5,118,042 A | 6/1992 | Delmer |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,232,159 A | 8/1993 | Abbate |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | De Frank |
| 5,282,916 A | 2/1994 | Bloom |
| 5,283,916 A | 2/1994 | Haro |
| 5,294,058 A | 3/1994 | Einav |
| 5,310,438 A | 5/1994 | Ruskin |
| 5,314,116 A | 5/1994 | Krauth |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | DeFrank |
| 5,337,597 A | 8/1994 | Peake |
| 5,353,993 A | 10/1994 | Rosenberg |
| 5,364,032 A | 11/1994 | De Frank |
| 5,399,160 A | 3/1995 | Dunberger |
| 5,400,973 A | 3/1995 | Cohen |
| 5,413,282 A | 5/1995 | Boswell |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,465,905 A | 11/1995 | Elder |
| 5,522,551 A | 6/1996 | DeFrank |
| 5,531,381 A | 7/1996 | Ruttenberg |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard |
| 5,615,838 A | 4/1997 | Eckstein et al. |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,695,127 A | 12/1997 | Delmer |
| 5,711,482 A | 1/1998 | Yu |
| 5,722,601 A | 3/1998 | DeFrank |
| 5,727,733 A | 3/1998 | Ruttenberg |
| 5,732,887 A | 3/1998 | Roberts |
| 5,744,423 A | 4/1998 | Voris |
| 5,744,779 A | 4/1998 | Buluschek |
| 5,785,785 A | 7/1998 | Delmer |
| 5,813,603 A | 9/1998 | Kurtz |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank |
| 5,865,377 A | 2/1999 | DeFrank |
| 5,871,325 A | 2/1999 | Schmidt |
| 5,875,815 A | 3/1999 | Ungerecht |
| 5,898,019 A | 4/1999 | Van Voris |
| 5,944,260 A | 8/1999 | Wang |
| 5,957,391 A | 9/1999 | DeFrank et al. |
| 5,972,375 A | 10/1999 | Truter |
| 5,988,211 A | 11/1999 | Cornell |
| 6,015,102 A | 1/2000 | Daigle |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,095,185 A | 8/2000 | Rosenberg |
| 6,109,296 A | 8/2000 | Austin |
| 6,116,523 A | 9/2000 | Cabahug |
| 6,120,634 A | 9/2000 | Harrold |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert |
| 6,302,338 B1 | 10/2001 | Cohen |
| 6,308,902 B1 | 10/2001 | Huntley |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 | 5/2002 | Perkins |
| 6,394,412 B2 | 5/2002 | Zakai |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |

(56) References Cited

U.S. PATENT DOCUMENTS

| | | | |
|---|---|---|---|
| 6,557,819 | B2 | 5/2003 | Austin |
| 6,561,443 | B2 | 5/2003 | Delmer |
| 6,568,607 | B2 | 5/2003 | Boswell et al. |
| 6,581,262 | B1 | 6/2003 | Myers |
| 6,581,854 | B2 | 6/2003 | Eckstein et al. |
| 6,581,902 | B2 | 6/2003 | Michau |
| 6,620,278 | B1 | 9/2003 | Harrold |
| 6,622,427 | B2 | 9/2003 | Breitner |
| 6,622,946 | B2 | 9/2003 | Held |
| 6,691,739 | B2 | 2/2004 | Rosenberg |
| 6,736,337 | B2 | 5/2004 | Vildibill |
| 6,750,760 | B2 | 6/2004 | Albritton |
| 6,764,029 | B2 | 7/2004 | Rosenberg |
| 6,817,548 | B2 | 11/2004 | Krauth |
| 6,821,928 | B2 | 11/2004 | Ruskin |
| 6,827,298 | B2 | 12/2004 | Sacks |
| 6,830,203 | B2 | 12/2004 | Neyestani |
| 6,875,491 | B2 | 4/2005 | Miyamoto |
| 6,886,761 | B2 | 5/2005 | Cohen |
| 6,894,250 | B2 | 5/2005 | Kertscher |
| 6,896,758 | B1 | 5/2005 | Giuffre' |
| 6,920,907 | B2 | 7/2005 | Harrold |
| 6,933,337 | B2 | 8/2005 | Lang |
| 6,936,126 | B2 | 8/2005 | DeFrank |
| 6,945,476 | B2 | 9/2005 | Giuffre |
| 6,996,932 | B2 | 2/2006 | Kruer |
| 6,997,402 | B2 | 2/2006 | Kruer |
| 7,007,916 | B2 | 3/2006 | Lee |
| 7,048,010 | B2 | 5/2006 | Golan |
| 7,108,205 | B1 | 9/2006 | Hashimshony |
| 7,175,113 | B2 | 2/2007 | Cohen |
| 7,241,825 | B2 | 7/2007 | Koga |
| 7,270,280 | B2 | 9/2007 | Belford |
| 7,300,004 | B2 | 11/2007 | Sinden |
| 7,363,938 | B1 | 4/2008 | Newton |
| 7,392,614 | B2 | 7/2008 | Kruer |
| 7,410,108 | B2 | 8/2008 | Rabinowitz |
| 7,445,021 | B2 | 11/2008 | Newton |
| 7,445,168 | B2 | 11/2008 | Ruskin |
| 7,455,094 | B2 | 11/2008 | Lee |
| 7,530,382 | B2 | 5/2009 | Kertscher |
| 7,648,085 | B2 | 1/2010 | Mavrakis |
| 7,681,805 | B2 | 3/2010 | Belford |
| 7,681,810 | B2 | 3/2010 | Keren |
| 7,695,587 | B2 | 4/2010 | Kertscher |
| 7,735,758 | B2 | 6/2010 | Cohen |
| 7,775,237 | B2 | 8/2010 | Keren |
| 7,802,592 | B2 | 9/2010 | McCarty |
| 7,887,664 | B1 | 2/2011 | Mata |
| 7,954,732 | B2 | 6/2011 | Shekalim |
| 7,988,076 | B2 | 8/2011 | Mamo |
| 8,002,496 | B2 | 8/2011 | Giuffre |
| 8,033,300 | B2 | 10/2011 | McCarty |
| D648,191 | S | 11/2011 | Thayer |
| 8,079,385 | B2 | 12/2011 | Hatton |
| 8,091,800 | B2 | 1/2012 | Retter |
| 8,096,491 | B2 | 1/2012 | Lutzki |
| 8,136,246 | B2 | 3/2012 | So |
| 8,141,589 | B2 | 3/2012 | Socolsky |
| D657,638 | S | 4/2012 | Einav |
| 8,267,115 | B2 | 9/2012 | Giuffre' |
| 8,286,667 | B2 | 10/2012 | Ruskin |
| 8,302,887 | B2 | 11/2012 | Park |
| 8,317,111 | B2 | 11/2012 | Cohen |
| 8,372,326 | B2 | 2/2013 | Mamo |
| 8,381,437 | B2 | 2/2013 | Ciudaj |
| 8,439,282 | B2 | 5/2013 | Allen |
| 8,454,786 | B2 | 6/2013 | Guichard |
| 8,469,294 | B2 | 6/2013 | Mata |
| 8,475,617 | B2 | 7/2013 | Kertscher |
| 8,511,585 | B2 | 8/2013 | Keren |
| 8,511,586 | B2 | 8/2013 | Einav |
| 8,628,032 | B2 | 1/2014 | Feith |
| 8,663,525 | B2 | 3/2014 | Mamo |
| 8,689,484 | B2 | 4/2014 | Ruskin |
| 8,714,205 | B2 | 5/2014 | Loebinger |
| 8,763,934 | B2 | 7/2014 | Patel |
| 8,870,098 | B2 | 10/2014 | Lutzki |
| 8,882,004 | B2 | 11/2014 | Gorney |
| 8,998,112 | B2 | 4/2015 | Cohen |
| 8,998,113 | B2 | 4/2015 | Keren |
| 9,022,059 | B2 | 5/2015 | Cohen |
| 9,022,764 | B2 | 5/2015 | Wisler |
| 9,027,856 | B2 | 5/2015 | DeFrank |
| D740,940 | S | 10/2015 | Fregoso |
| 9,192,108 | B2 | 11/2015 | Kertscher |
| 9,253,950 | B1 | 2/2016 | Clark |
| 9,258,949 | B2 | 2/2016 | Nourian |
| 9,258,950 | B2 | 2/2016 | Kidachi |
| 9,291,276 | B2 | 3/2016 | Keren |
| 9,345,205 | B2 | 5/2016 | Kidachi |
| 9,380,749 | B2 | 7/2016 | Akritanakis |
| 9,386,752 | B2 | 7/2016 | Einav |
| 9,433,157 | B2 | 9/2016 | Dermitzakis |
| 9,439,366 | B2 | 9/2016 | Kidachi |
| 9,485,923 | B2 | 11/2016 | Ensworth |
| D781,115 | S | 3/2017 | Einav |
| 9,695,965 | B2 | 7/2017 | Hadas |
| 9,807,948 | B2 | 11/2017 | Loebinger |
| 9,814,189 | B1 | 11/2017 | Clark |
| 9,872,444 | B2 | 1/2018 | Turk |
| 9,877,440 | B2 | 1/2018 | Ensworth |
| 9,877,441 | B2 | 1/2018 | Ensworth |
| 9,877,442 | B2 | 1/2018 | Kim |
| D811,179 | S | 2/2018 | Ensworth |
| 9,894,851 | B2 | 2/2018 | Desarzens |
| 9,949,448 | B2 | 4/2018 | Cohen |
| D816,439 | S | 5/2018 | Crook |
| 10,010,030 | B2 | 7/2018 | Motha |
| 10,070,595 | B2 | 9/2018 | Loebinger |
| 10,107,707 | B2 | 10/2018 | Defrank |
| 2002/0064935 | A1 | 5/2002 | Honda |
| 2002/0070297 | A1 | 6/2002 | Bolinis |
| 2002/0074434 | A1 | 6/2002 | Delmer |
| 2002/0088877 | A1 | 7/2002 | Bertolotti |
| 2002/0104902 | A1 | 8/2002 | Eckstein |
| 2002/0104903 | A1 | 8/2002 | Eckstein |
| 2002/0113147 | A1 | 8/2002 | Huntley |
| 2003/0029937 | A1 | 2/2003 | Dermitzakis |
| 2003/0042335 | A1 | 3/2003 | Krauth |
| 2003/0050372 | A1 | 3/2003 | Stanhope |
| 2003/0057301 | A1 | 3/2003 | Cohen |
| 2003/0089409 | A1 | 5/2003 | Morimoto |
| 2003/0090369 | A1 | 5/2003 | Albritton |
| 2003/0092808 | A1 | 5/2003 | Stanhope |
| 2003/0140977 | A1 | 7/2003 | Berton |
| 2003/0150940 | A1 | 8/2003 | Vildibill |
| 2003/0226913 | A1 | 12/2003 | Brunnengraeber |
| 2004/0018263 | A1 | 1/2004 | Hashimshony |
| 2004/0164185 | A1 | 8/2004 | Giuffre |
| 2005/0029231 | A1 | 2/2005 | Kertscher |
| 2005/0077396 | A1 | 4/2005 | Rabinowitz |
| 2005/0103409 | A1 | 5/2005 | Weber |
| 2005/0133613 | A1 | 6/2005 | Mayer |
| 2005/0224607 | A1 | 10/2005 | Dinur |
| 2005/0224962 | A1 | 10/2005 | Akamatsu |
| 2005/0258278 | A1 | 11/2005 | Cohen |
| 2005/0258279 | A1 | 11/2005 | Harrold |
| 2005/0279866 | A1 | 12/2005 | Belford |
| 2005/0284966 | A1 | 12/2005 | DeFrank |
| 2006/0032949 | A1 | 2/2006 | Lo |
| 2006/0043219 | A1 | 3/2006 | Raanan |
| 2006/0144965 | A1 | 7/2006 | Keren |
| 2006/0163388 | A1 | 7/2006 | Mari |
| 2006/0169805 | A1 | 8/2006 | Dabir |
| 2006/0186228 | A1 | 8/2006 | Belford |
| 2006/0202381 | A1 | 9/2006 | Bach |
| 2006/0237561 | A1 | 10/2006 | Park |
| 2006/0255186 | A1 | 11/2006 | Ruskin |
| 2007/0095950 | A1 | 5/2007 | Kim |
| 2007/0108318 | A1 | 5/2007 | Mamo |
| 2007/0138323 | A1 | 6/2007 | Lee |
| 2007/0187031 | A1 | 8/2007 | Kertscher |
| 2007/0194149 | A1 | 8/2007 | Mavrakis |

(56) References Cited

U.S. PATENT DOCUMENTS

| | | |
|---|---|---|
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0190256 A1 | 8/2008 | So |
| 2008/0237374 A1 | 10/2008 | Belford |
| 2008/0257991 A1 | 10/2008 | Einav |
| 2008/0265064 A1 | 10/2008 | Keren |
| 2009/0020634 A1 | 1/2009 | Schweitzer |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney |
| 2009/0243146 A1 | 10/2009 | Retter |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2009/0320932 A1 | 12/2009 | Giuffre |
| 2010/0023717 A1 | 1/2010 | Jinno |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1 | 9/2010 | Mamo |
| 2010/0252126 A1 | 10/2010 | Roes |
| 2010/0252127 A1 | 10/2010 | Gross |
| 2010/0282873 A1 | 11/2010 | Mattlin |
| 2011/0186652 A1 | 8/2011 | Cohen |
| 2011/0226354 A1 | 9/2011 | Thordarson |
| 2012/0012678 A1 | 1/2012 | Gregory |
| 2012/0012682 A1 | 1/2012 | Einav |
| 2012/0074345 A1 | 3/2012 | Hatton |
| 2012/0097196 A1 | 4/2012 | Cohen |
| 2012/0097254 A1 | 4/2012 | Cohen |
| 2012/0097769 A1 | 4/2012 | Zavoli |
| 2012/0104648 A1 | 5/2012 | Yiflach |
| 2012/0126036 A1 | 5/2012 | Patel |
| 2012/0199673 A1 | 8/2012 | Cohen |
| 2012/0267454 A1 | 10/2012 | Einav |
| 2012/0305676 A1 | 12/2012 | Keren |
| 2013/0181066 A1 | 7/2013 | Dermitzakis |
| 2013/0248616 A1 | 9/2013 | Ensworth |
| 2013/0248622 A1 | 9/2013 | Kim |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0246520 A1 | 9/2014 | Einav |
| 2014/0263758 A1 | 9/2014 | Turk |
| 2015/0014446 A1 | 1/2015 | Cohen |
| 2015/0041563 A1 | 2/2015 | Ensworth |
| 2015/0041564 A1 | 2/2015 | Ensworth |
| 2015/0090815 A1 | 4/2015 | Akritanakis |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0181820 A1 | 7/2015 | Crook |
| 2015/0201568 A1 | 7/2015 | Einav |
| 2015/0223414 A1 | 8/2015 | Kidachi |
| 2015/0250111 A1 | 9/2015 | Kidachi |
| 2015/0296723 A1 | 10/2015 | Jain |
| 2015/0319940 A1 | 11/2015 | Kidachi |
| 2015/0351333 A1 | 12/2015 | Eberle |
| 2016/0057947 A1 | 3/2016 | Ensworth |
| 2016/0075070 A1 | 3/2016 | Verelis |
| 2016/0076965 A1 | 3/2016 | Edris |
| 2016/0088806 A1 | 3/2016 | Haub |
| 2016/0095285 A1 | 4/2016 | Loebinger |
| 2016/0198643 A1 | 7/2016 | Cohen |
| 2016/0219802 A1 | 8/2016 | Ensworth |
| 2016/0219803 A1 | 8/2016 | Keren |
| 2016/0223092 A1 | 8/2016 | Hadas |
| 2016/0278311 A1 | 9/2016 | Kidachi |
| 2016/0286741 A1 | 10/2016 | Kidachi |
| 2016/0286743 A1 | 10/2016 | Einav |
| 2016/0309669 A1 | 10/2016 | Kidachi |
| 2016/0330917 A1 | 11/2016 | Kidachi |
| 2017/0035005 A1 | 2/2017 | Kidachi |
| 2017/0035006 A1 | 2/2017 | Kim |
| 2017/0112078 A1 | 4/2017 | Ensworth |
| 2017/0118927 A1 | 5/2017 | Loebinger |
| 2017/0142916 A1 | 5/2017 | Shamshery |
| 2017/0205013 A1 | 7/2017 | Smith |
| 2017/0292646 A1 | 10/2017 | Hadas |
| 2018/0027756 A1 | 2/2018 | Kidachi |
| 2018/0098514 A1 | 4/2018 | Socolsky |
| 2018/0110191 A1 | 4/2018 | Keren |
| 2018/0116134 A1 | 5/2018 | Ensworth |
| 2018/0168116 A1 | 6/2018 | Morikoshi |
| 2018/0168117 A1 | 6/2018 | Noguchi |
| 2018/0177145 A1 | 6/2018 | Morikoshi |
| 2018/0199524 A1 | 7/2018 | Socolsky |
| 2018/0228097 A1 | 8/2018 | Alkalay |
| 2018/0266576 A1 | 9/2018 | Balet |
| 2018/0317406 A1 | 11/2018 | Tsouri |
| 2018/0328498 A1 | 11/2018 | Rulli |
| 2018/0338434 A1 | 11/2018 | Wlassich |

FOREIGN PATENT DOCUMENTS

| | | |
|---|---|---|
| CA | 1053726 | 5/1979 |
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 6/1974 |
| DE | 3525591 | 1/1986 |
| EP | 0160299 A2 | 11/1985 |
| EP | 0344605 A2 | 12/1989 |
| EP | 0353982 | 2/1990 |
| EP | 0444425 A1 | 9/1991 |
| EP | 0480632 A2 | 4/1992 |
| EP | 0491115 A1 | 6/1992 |
| EP | 0549515 A1 | 6/1993 |
| EP | 636309 A1 | 2/1995 |
| EP | 0709020 | 5/1996 |
| EP | 0730822 A2 | 9/1996 |
| EP | 493299 | 5/1997 |
| EP | 0872172 A1 | 10/1998 |
| EP | 1701147 | 9/2006 |
| EP | 2952091 A1 | 12/2015 |
| FR | 2366790 | 5/1978 |
| GB | 1498545 | 1/1978 |
| GB | 2057960 A | 4/1991 |
| IL | 42705 A | 3/1976 |
| IL | 53463 A | 3/1983 |
| IL | 97564 A | 7/1996 |
| IT | 1255120 | 10/1995 |
| JP | 2000228417 | 8/2000 |
| RU | 2240682 | 1/2005 |
| RU | 2275791 | 3/2006 |
| RU | 2415565 | 4/2011 |
| WO | 9205689 A1 | 4/1992 |
| WO | 9221228 | 12/1992 |
| WO | 9427728 | 12/1994 |
| WO | 1995029761 | 11/1995 |
| WO | 9614939 | 5/1996 |
| WO | 9810635 A1 | 3/1998 |
| WO | 9902273 A1 | 1/1999 |
| WO | 9918771 A1 | 4/1999 |
| WO | 9955141 A1 | 11/1999 |
| WO | 0001219 | 1/2000 |
| WO | 0010378 A1 | 3/2000 |
| WO | 0030760 | 6/2000 |

(56) References Cited

FOREIGN PATENT DOCUMENTS

| WO | 136106 A1 | 5/2001 |
|---|---|---|
| WO | 0156768 A1 | 8/2001 |
| WO | 2001064019 | 9/2001 |
| WO | 0204130 A1 | 1/2002 |
| WO | 0215670 | 2/2002 |
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 A2 | 3/2006 |
| WO | 2006038246 | 4/2006 |
| WO | 2007068523 A1 | 6/2007 |
| WO | 2010022471 | 3/2010 |
| WO | 2010048063 | 4/2010 |
| WO | 2011092557 | 8/2011 |
| WO | 2012015655 A1 | 2/2012 |
| WO | 2012160121 | 11/2012 |
| WO | 2013148672 | 10/2013 |
| WO | 2013155173 A2 | 10/2013 |
| WO | 2013192321 | 12/2013 |
| WO | 2014064452 | 5/2014 |
| WO | 2015023624 | 2/2015 |
| WO | 2015098412 | 7/2015 |
| WO | 2016156814 | 10/2016 |

OTHER PUBLICATIONS

Patent Cooperation Treaty, International Searching Authority, Notification of Transmittal of the International Search Report and the Written Opinion of the International Searching Authority, or the Declaration, issued in International Application No. PCT/US2013/033668, Jun. 17, 2013, 10 pp.
European Patent Office, Extended European Search Report issued in Application No. 13768209.2, Nov. 24, 2015, 10 pp.
Final Office Action mailed Aug. 25, 2015; U.S. Appl. No. 13/430,308; 11 pages.
Final Office Action mailed Jul. 21, 2016; U.S. Appl. No. 13/430,308; 9 pages.
Non-Final Office Action mailed Feb. 11, 2016; U.S. Appl. No. 13/430,308; 9 pages.
USPTO, Non-Final Office Action dated Apr. 27, 2017, U.S. Appl. No. 15/331,407, 7 pages.
Alam, M., et al., "Subsurface Drip Irrigation for Alfalfa," Kansas State University, 2009, pp. 1-8.
Alapati, Nanda K., Netafim Letter dated Mar. 30, 2012 with enclosure and attachments, 13 pages.
Alapati, Nanda K., Netafim Letter dated Mar. 30, 2012 with enclosure, 6 pages.
Arduini, I., et al., "Influence of Copper on Root Growth and Morphology of Pinus Pinea L. and Pinus Pinaster Ait. Seedlings," Tree Physiology, 15, 1995, pp. 411-415.
Bernard, H., et al., "Assessment of herbicide leaching risk in two tropical soils of Reunion Island (France)," J Environ Qual 34:534-543, (2005).
Beverage, K., "Drip Irrigation for Row Crops," New Mexico State University, 2001, pp. 1-43.
Borkow, G., et al., "A Novel Anti-Influenza Copper Oxide Containing Respiratory Face Mask," PLoS ONE, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update on Copper Root Control," Spin Out, 1997.
Diver, S., et al., "Sustainable Small-Scale Nursery Production," ATTRA, Nov. 2001, pp. 1-31.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for state-wide assessment of groundwater vulnerability from pesticide use in agriculture," Pest Manag Sci, 60:739-745 (online:2004).
European Patent Office, Extended European Search Report for European Application No. 13770084.5 dated Feb. 11, 2016, 7 pages.
European Patent Office, Office Action for European Application No. 10160675.4 dated Mar. 27, 2012, 2 pp.
European Patent Office, Search Report for European Application No. 10160675.4 dated Aug. 6, 2010, 2 pp.
Fitch, Even, Tabin & Flannery; Letter, Apr. 23, 2008, 1 p.
Giles-Parker, C, EPA, Pesticide Fact Sheet, pp. 1-4.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).
Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.
Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jiang, W. et al., "Effects of Copper on Root Growth, Cell Division, and Nucleolus of Zea mays," Biologia Plantarum, 44(1), 2001, pp. 105-109.
Kuhns, L. et al., "Copper Toxicity in Woody Ornamentals," Journal of Arboriculture, Apr. 1976. pp. 68-78.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, RAM Catalog Figures, Jan. 2000, 4 pages.
Netafim USA, Triton X Heavywall Dripperline Catalog, May 2007, 8 pages.
Patent Cooperation Treaty, Application No. PCT/US2013/033866, International Search Report and Written Opinion dated Jun. 19, 2013, 38 pp.
Patent Cooperation Treaty, International Search Report issued in International Application No. PCT/US2013/046603, dated Sep. 19, 2013, 2 pp.
Patent Cooperation Treaty, Notification of Transmittal of the International Search Report and the Written Opinion of the International Searching Authority issued in International Application No. PCT/US2014/050623, dated Nov. 20, 2014, 17 pp.
Patent Cooperation Treaty, Written Opinion of the International Searching Authority issued in International Application No. PCT/US2013/046603, dated Sep. 19, 2013, 4 pp.
PCT International Application No. PCT/US2013/033866 filed Mar. 26, 2013.

(56) References Cited

OTHER PUBLICATIONS

Rain Bird Corporation, Agriculture Irrigation Equipment 1981 Catalog, 3 pages.
Rain Bird Corporation, Drip Watering System 1994 Catalog, 1993, 16 pages.
Rain Bird Corporation, Landscape Irrigation Products 1993-1994 Catalog, Feb. 1993, 5 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, Mar. 2001, 9 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, Jun. 2004, 13 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, Nursery Equipment Catalog 1986/1987, 1986, 3 pages.
Rain Bird Corporation, PC Dripline Pressure Compensating Inline Emitter Tubing Catalog, Oct. 1998, 16 pages.
Rain Bird Corporation, Turf Irrigation Equipment 1982 Catalog, 1982, 4 pages.
Rain Bird Corporation, Turf Irrigation Equipment 1983 Catalog, 1983, 4 pages.
Rain Bird Corporation, Turf Irrigation Equipment 1985 Catalog, 1985, 3 pages.
Rain Bird Corporation, Turf Irrigation Equipment 1985 Catalog, p. 73, 1985, 3 pages.
Rain Bird Corporation, Turf Irrigation Equipment 1987 Catalog, 1987, 6 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Smiley, E. T., "Root Growth Near Vertical Root Barriers," International Society of Arboriculture, 1995, pp. 150-152.
Spera, G., et al., "Subsurface drip irrigation with micro-encapsulated trifluralin. Trifluralin residues in soils and cultivations," Commun Agric Appl Biol Sci 71:161-170, (2006).
State Intellectual Property Office, First Office Action issued in Chinese Application No. 201380016629.9, dated Nov. 4, 2015, 16 pp.
The Clean Estuary Partnership, "Copper Sources in Urban Runoff and Shoreline Activities," TDC Environmental, LLC, 2004, pp. 1-72.
U.S. Appl. No. 11/359,181, filed Feb. 22, 2006, entitled "Drip Emitter," and dated Jan. 19, 2010 as U.S. Pat. No. 7,648,085.
U.S. Appl. No. 11/394,755, filed Mar. 31, 2006, entitled "Drip Emitter."
U.S. Appl. No. 12/347,266, filed Dec. 31, 2008, entitled "Low Flow Irrigation Emitter."
U.S. Appl. No. 12/367,295, filed Feb. 6, 2009, entitled "Low Flow Irrigation Emitter."
U.S. Appl. No. 12/436,394, filed May 6, 2009, entitled "Drip Emitter and Methods of Assembly and Mounting."
U.S. Appl. No. 12/495,178, filed Jun. 30, 2009, entitled "Drip Emitter."
U.S. Appl. No. 12/495,193, filed Jun. 30, 2009, entitled "Drip Emitter," which is a continuation of U.S. Appl. No. 11/359,181.
U.S. Appl. No. 13/430,249, filed Mar. 26, 2012.
U.S. Appl. No. 13/964,903, filed Aug. 12, 2013.
U.S. Appl. No. 14/139,217, filed Dec. 23, 2013.
U.S. Appl. No. 11/394,755, Office Action dated Aug. 14, 2008.
U.S. Appl. No. 11/394,755, Office Action dated Feb. 7, 2008.
U.S. Appl. No. 11/394,755, Office Action dated Jul. 17, 2007.
U.S. Appl. No. 11/394,755, Office Action dated Jul. 17, 2009.
U.S. Appl. No. 11/394,755, Office Action dated Mar. 31, 2009.
U.S. Appl. No. 11/394,755, Office Action dated May 12, 2011.
U.S. Appl. No. 11/394,755; Office Action dated Dec. 19, 2011.
U.S. Appl. No. 12/347,266, Office Action dated Mar. 7, 2011.
U.S. Appl. No. 12/347,266, Office Action dated Nov. 17, 2010.
U.S. Appl. No. 12/347,266, Office Action dated Sep. 7, 2010.
U.S. Appl. No. 12/367,295, Office Action dated Feb. 11, 2011.
U.S. Appl. No. 12/367,295, Office Action dated Jul. 15, 2011.
U.S. Appl. No. 12/367,295; Office Action dated Jun. 8, 2012.
U.S. Appl. No. 12/495,178, Office Action dated Feb. 3, 2010.
U.S. Appl. No. 12/495,178; Office Action dated Apr. 18, 2014, 12 pages.
U.S. Appl. No. 12/495,178; Office Action dated Jun. 21, 2012.
U.S. Appl. No. 12/495,178; Office Action dated Mar. 11, 2015, 6 pages.
U.S. Appl. No. 12/495,178; Office Action dated Nov. 18, 2014, 8 pages.
U.S. Appl. No. 12/495,178; Office Action dated Oct. 6, 2015, 8 pages.
U.S. Appl. No. 12/495,193, Office Action dated Jan. 6, 2012.
U.S. Appl. No. 12/495,193, Office Action dated May 11, 2011.
U.S. Appl. No. 12/495,193; Advisory Action dated Sep. 5, 2013.
U.S. Appl. No. 12/495,193; Notice of Allowance dated Feb. 10, 2017, 7 pages.
U.S. Appl. No. 12/495,193; Notice of Allowance dated May 4, 2017.
U.S. Appl. No. 12/495,193; Notice of Allowance dated Oct. 14, 2016, 7 pages.
U.S. Appl. No. 12/495,193; Office Action dated Apr. 18, 2014, 23 pages.
U.S. Appl. No. 12/495,193; Office Action dated Aug. 29, 2016.
U.S. Appl. No. 12/495,193; Office Action dated Jan. 15, 2015, 11 pages.
U.S. Appl. No. 12/495,193; Office Action dated Jun. 18, 2013.
U.S. Appl. No. 12/495,193; Office Action dated Oct. 1, 2015, 9 pages.
U.S. Appl. No. 13/430,249; Notice of Allowance dated Apr. 14, 2016, 7 pages.
U.S. Appl. No. 13/430,249; Notice of Allowance dated Sep. 19, 2016, 6 pages.
U.S. Appl. No. 13/430,249; Office Action dated Mar. 24, 2015, 10 pages.
U.S. Appl. No. 13/430,249; Office Action dated Oct. 26, 2015, 10 pages.
U.S. Appl. No. 13/800,354; Office Action dated Sep. 25, 2014, 13 pages.
U.S. Appl. No. 13/839,726; Notice of Allowance dated Aug. 15, 2016, 5 pages.
U.S. Appl. No. 13/839,726; Notice of Allowance dated Dec. 1, 2016, 5 pages.
U.S. Appl. No. 13/839,726; Notice of Allowance dated Dec. 31, 2015, 5 pages.
U.S. Appl. No. 13/839,726; Office Action dated Apr. 26, 2016, 4 pages.
U.S. Appl. No. 13/839,726; Office Action dated Mar. 20, 2017, 4 pages.
U.S. Appl. No. 13/839,726; Office Action dated May 28, 2015, 5 pages.
U.S. Appl. No. 13/839,726; Office Action dated May 30, 2017 (4 pages).
U.S. Appl. No. 13/964,903; Office Action dated Jun. 3, 2015, 21 pages.
U.S. Appl. No. 13/964,903; Office Action dated Mar. 7, 2016, 21 pages.
U.S. Appl. No. 14/047,489; Office Action dated Jun. 29, 2015, 7 pages.
U.S. Appl. No. 14/047,489; Office Action dated Oct. 7, 2015, 9 pages.
U.S. Appl. No. 14/139,217; Office Action dated Apr. 8, 2015, 9 pages.
U.S. Appl. No. 14/139,217; Office Action dated Sep. 18, 2015, 11 pages.
U.S. Appl. No. 14/385,564; Office Action dated Aug. 10, 2016, 9 pages.

(56) References Cited

OTHER PUBLICATIONS

U.S. Appl. No. 14/385,564; Office Action dated Mar. 10, 2017, 8 pages.
U.S. Appl. No. 14/475,435; Office Action dated Jan. 26, 2017.
U.S. Appl. No. 14/475,435; Office Action dated Jul. 20, 2016, 9 pages.
U.S. Appl. No. 14/518,774; Office Action dated May 10, 2017.
U.S. Appl. No. 14/851,545; Office Action dated Apr. 24, 2017.
U.S. Appl. No. 14/910,573; Office Action dated Jun. 27, 2017 (10 pages).
U.S. Appl. No. 15/344,843; Office Action dated Apr. 28, 2017.
U.S. Appl. No. 13/964,903; Office Action dated Oct. 31, 2016, 22 pages.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
European Patent Office, Communication Pursuant to Article 94(3) EPC issued in European Application No. 14 836 360.9, dated Feb. 8, 2017, 7 pp.
U.S. Appl. No. 14/385,564; Notice of Allowance dated Aug. 22, 2017; (pp. 1-8).
U.S. Appl. No. 13/839,726; Notice of Allowance dated Sep. 14, 2017; (pp. 1-5).
U.S. Appl. No. 13/964,903; Notice of Allowance dated Sep. 18, 2017; (pp. 1-7).
U.S. Appl. No. 14/475,435; Office Action dated Sep. 27, 2017; (pp. 1-9).
U.S. Appl. No. 15/344,843; Notice of Allowance dated Oct. 16, 2017; (pp. 1-7).
U.S. Appl. No. 14/518,774; Notice of Allowance dated Oct. 26, 2017; (pp. 1-7).
U.S. Appl. No. 14/851,545; Office Action dated Oct. 30, 2017; (pp. 1-27).
U.S. Appl. No. 15/331,407; Notice of Allowance dated Oct. 27, 2017; (pp. 1-9).
Patent Cooperation Treaty, Notification of Transmittal of the International Search Report and the Written Opinion of the International Searching Authority, or the Declaration, Issued in International Application No. PCT/US2017042378, dated Oct. 26, 2017, 7 pp.
U.S. Appl. No. 14/385,564; Notice of Allowability dated Nov. 29, 2017; (pp. 1-2).
U.S. Appl. No. 15/331,407; Notice of Allowability dated Nov. 30, 2017; (pp. 1-2).
U.S. Appl. No. 15/344,843; Notice of Allowability dated Nov. 30, 2017; (pp. 1-2).
ASME 2015 International Design Engineering Technical Conferences & Computers and Information in Engineering Conference, K. Taylor et al, "A Mathematical Model For Pressure Compensating Emitters", Aug. 2-5, 2015, Boston, Massachusetts, USA, 10 pp.
http://aasystems.eu/dripper/; Advanced Automation Systems Ltd., Dec. 18, 2015, 12 pp.
U.S. Appl. No. 13/964,903; Noticeof Allowance dated Apr. 5, 2018 (pp. 1-5).
Patent Cooperation Treaty, International Searching Authority, Notification of Transmittal of the International Search Report and the Written Opinion of the International Searching Authority, or the Declaration, issued in International Application No. PCT/US2018/015516, Jun. 28, 2018, 8 pp.
State Intellectual Property Office of People's Republic of China, First Office Action issued in Application No. 201480045002.0, Apr. 16, 2018, 20 pp.
U.S. Appl. No. 15/650,379; Office Action dated May 18, 2018 (pp. 1-8).
U.S. Appl. No. 14/851,545; Office Action dated Jul. 3, 2018; (pp. 1-29).
Dixieline Lumber & Home Centers Catalog, DIG Irrigation Products Drip Tubing, 2003, p. 13.

Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.
Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright dated Aug. 2003, pp. 106-107.
Rain Bird® Nursery Equipment Catalog 1986-1987, D32304, copyright date 1986, p. 13.
Rain Bird® XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexibility, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filing date of the instant application, 5 pages.
DIG® Irrigation Product Catalog, <www.digcorp.com>, 2018, 72 pages.
DIG® Irrigation Product Catalog, <www.digcorp.com>, 2012, 32 pages.
DIG® Irrigation Product Catalog, <www.digcorp.com>, 2016, 72 pages.
Irritec® On Line Drippers iDrop®, Drritec S.p.A, <www.irritec.com>, available prior to May 15, 2017, 2 pages.
Irritec® Product Catalog and Price List, Irritec USA Inc., <www.irritec.com>, 2016, 66 pages.
Irritec™ USA iDrop™ PCDS, Irritec USA Inc., <www.irritecusa.com>, available prior to May 15, 2017, 2 pages.
Jain® Button Emitters, Jain Irrigation Inc., <www.jainsusa.com>, available prior to May 15, 2017, 2 pages.
Jain® Emission Devices, Jain Irrigation Systems Ltd., <www.jainsusa.com>, available prior to May 15, 2017, pp. 171-182.
Jain® Landscape Catalog, Jain Irrigation, Inc., <www.jainsusa.com>, 2016, 102 pages.
Jain® Online Emitters, Jain Irrigation Systems Ltd., <www.jainsusa.com>, available prior to May 15, 2017, 2 pages.
Netafim™ Non-Pressure Compensating Drippers, Netafim USA, <www.netafimusa.com>, available prior to May 15, 2017, 2 pages.
Netafim™ Point Source Emitters, Netafim USA, <www.netafimusa.com>, available prior to May 15, 2017, 4 pages.
Netafim™ Pressure Compensating (PC) Spray Stakes, Netafim USA, <www.netafimusa.com>, as of Apr. 2016, 12 pages.
Netafim™ Pressure Compensating Drippers, Netafim USA, <www.netafimusa.com>, Apr. 2016, 2 pages.
Netafim™ Pressure Compensating Drippers, Netafim USA, <www.netafimusa.com>, Jun. 2018, 2 pages.
Photograph of DIG® Product No. PCA-003CV, available prior to May 15, 2017, 1 page.
Photograph of Irritec® Product No. A6-WPC2BB, available prior to May 15, 2017, 1 page.
Photograph of Irritec® Product No. A6-WPC3BB, available prior to May 15, 2017, 1 page.
Photograph of Jain® Product No. CTTPC2-CNL, available prior to May 15, 2017, 1 page.
Photograph of Jain® Product No. CTTPC4-CNL, available prior to May 15, 2017, 1 page.
Photograph of Netafim™ Product No. SPCV10, available prior to May 15, 2017, 1 page.
Photograph of Netafim™ Product No. Techflow Emitter WPC20, available prior to May 15, 2017, 1 page.
Photograph of Netafim™ Product No. WPC10, available prior to May 15, 2017, 1 page.

(56) References Cited

OTHER PUBLICATIONS

Photograph of Netafim™ Woodpecker Junior Product No. 01WPCJL4, available prior to May 15, 2017, 1 page.
Photograph of Toro® Product No. A6-WPC2BB, available prior to May 15, 2017, 1 page.
Price Book, Oct. 2015, Rivulis Irrigation, Oct. 2015 (Revised Apr. 2016), <rivulis.com>, 116 pages.
Toro® NGE® AL Anti-Drain Pressure Compensating Emitter, The Toro Company, <www.toro.com>, 2012, 2 pages.
Toro® NGE® Emitters, The Toro Company, <www.toro.com>, 2018, 2 pages.
Toro® NGE® New Generation Emitters, The Toro Company, <www.toro.com>, 2013, 2 pages.
Toro® NGE® SF Self-flushing Pressure Compensating Emitter, The Toro Company, <www.toro.com>, 2012, 2 pages.
Toro® Turbo-SC® Plus Pressure-compensating Emitter, The Toro Company, <www.toro.com>, 2009, 2 pages.
U.S. Appl. No. 15/650,379; Notice of Allowance dated Feb. 19, 2019; (pp. 1-5).
European Patent Office, Communication Pursuant to Article 94(3) EPC issued in European Application No. 13 768 209.2, dated Jan. 4, 2019, 5 pp.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
Photograph of Toro® Product No. DPC08-MA-Red, Jun. 22, 2012, 1 page.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
U.S. Appl. No. 13/964,903; Notice of Allowance dated Mar. 26, 2019; (pp. 1-5).
U.S. Appl. No. 15/650,379; Notice of Allowance dated Mar. 26, 2019; (pp. 1-5).
U.S. Appl. No. 15/595,427; Office Action dated Apr. 4, 2019; (pp. 1-6).
U.S. Appl. No. 14/851,545; Notice of Allowance dated Apr. 17, 2019; (pp. 1-9).
U.S. Appl. No. 14/910,573; Office Action dated May 6, 2019; (pp. 1-11).
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
Cetesb and Sindiplast, Environmental Guide of the Plastic Materials Recycling and Processing Industry [electronic resource], Technical elaboration: Gilmar do Amaral et al., Collaborators: Andre H.C. Botto e Souze et al., 2011. Retrieved from the Internet: <URL: http://file.sindiplast.org.br/download/guia_ambiental_internet.pdf>, 91 pages.
U.S. Appl. No. 13/964,903; Notice of Allowance dated Dec. 14, 2018; (pp. 1-5).
U.S. Appl. No. 15/595,427; Office Action dated Dec. 17, 2018; (pp. 1-6).
Photographs of an in-line cylindrical drip emitter on sale or publicly disclosed more than a year before the filing of the instant application, 2 pages.
Eurodrip U.S.A., Inc., 2009 Irrigation Products Catalog, p. 4-5, 4 pages.
Eurodrip U.S.A., Inc., Products Guide, copyright date Nov. 2007, 2 pages.
Hunter Industries, Drip Design Guide, Dec. 2012, 32 pages.
Jain Irrigation Inc., 2009 Product Catalog, pp. 12-13, copyright date 2009 (revised Oct. 2008), 4 pages.
NDS Inc., AGRIFIM Drip and Micro Irrigation Catalog, Jan. 2004, 3 pages.
Netafim USA, Landscape & Turf Division Product Catalog, Aug. 2004, 36 pages.
Netafim, RAM Pressure Compensating Dripperline brochure, Feb. 1997, 4 pages.
Rain Bird Corporation, Rain Bird PC Dripline brochure, copyright date Nov. 2000, 12 pages.
Siplast/Irritec Multibar Pressure Compensated Coextruded Dripline, Jul. 22, 2005, 4 pages.
The Toro Company, 2000-2001 Irrigation Products Catalog, p. 28, copyright date Oct. 1999, 3 pages.
The Toro Company, Drip In Classic Turbulent Flow Dripline brochure, Jun. 2014, 4 pages.
The Toro Company, Drip In PC Brown Dripline brochure, 2015, 2 pages.
European Patent Application No. 18172143.2, Extended European Search Report, dated Oct. 15, 2018, 9 pages.
U.S. Appl. No. 14/851,545; Office Action dated Oct. 29, 2018; (pp. 1-32).

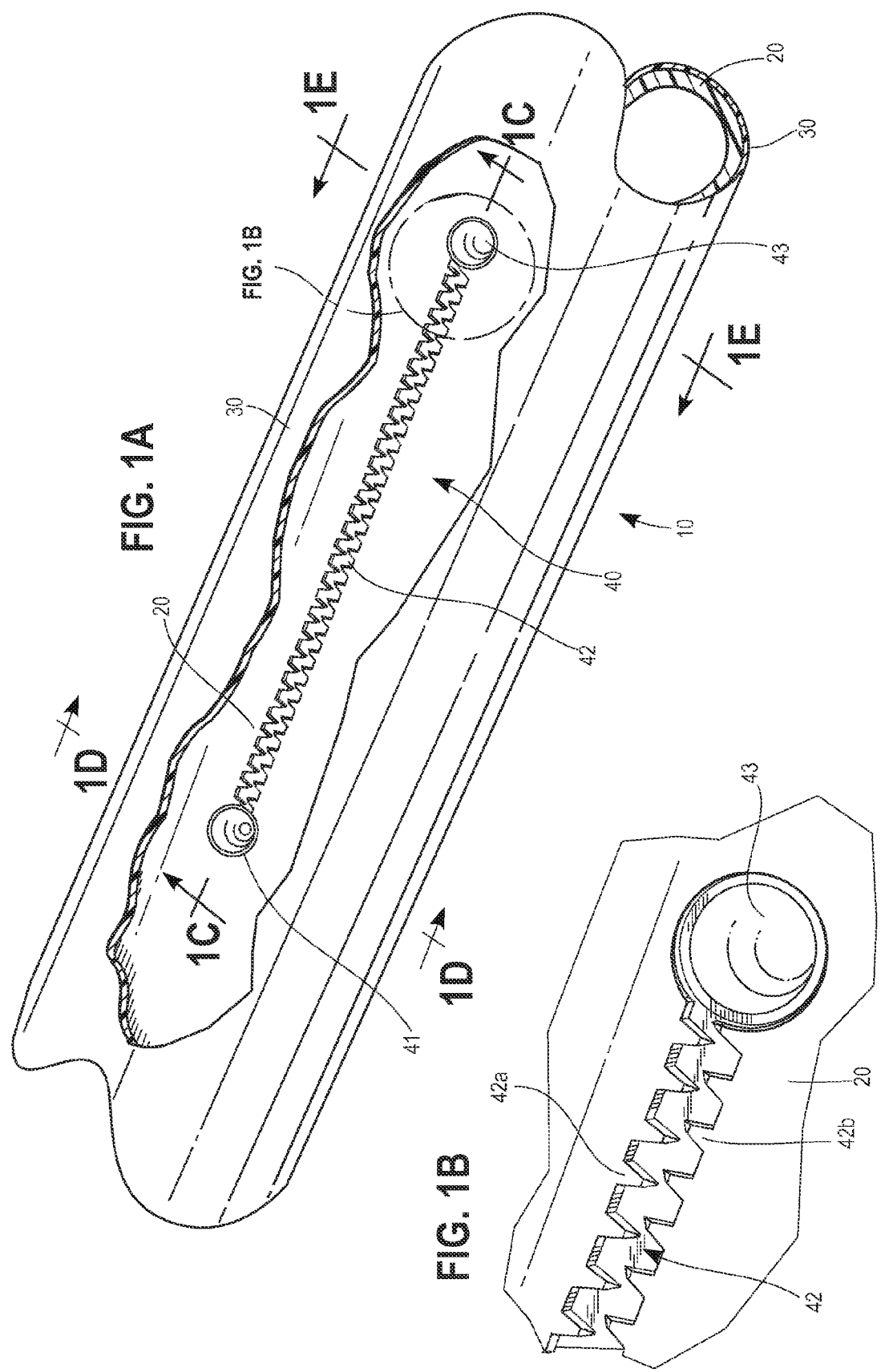

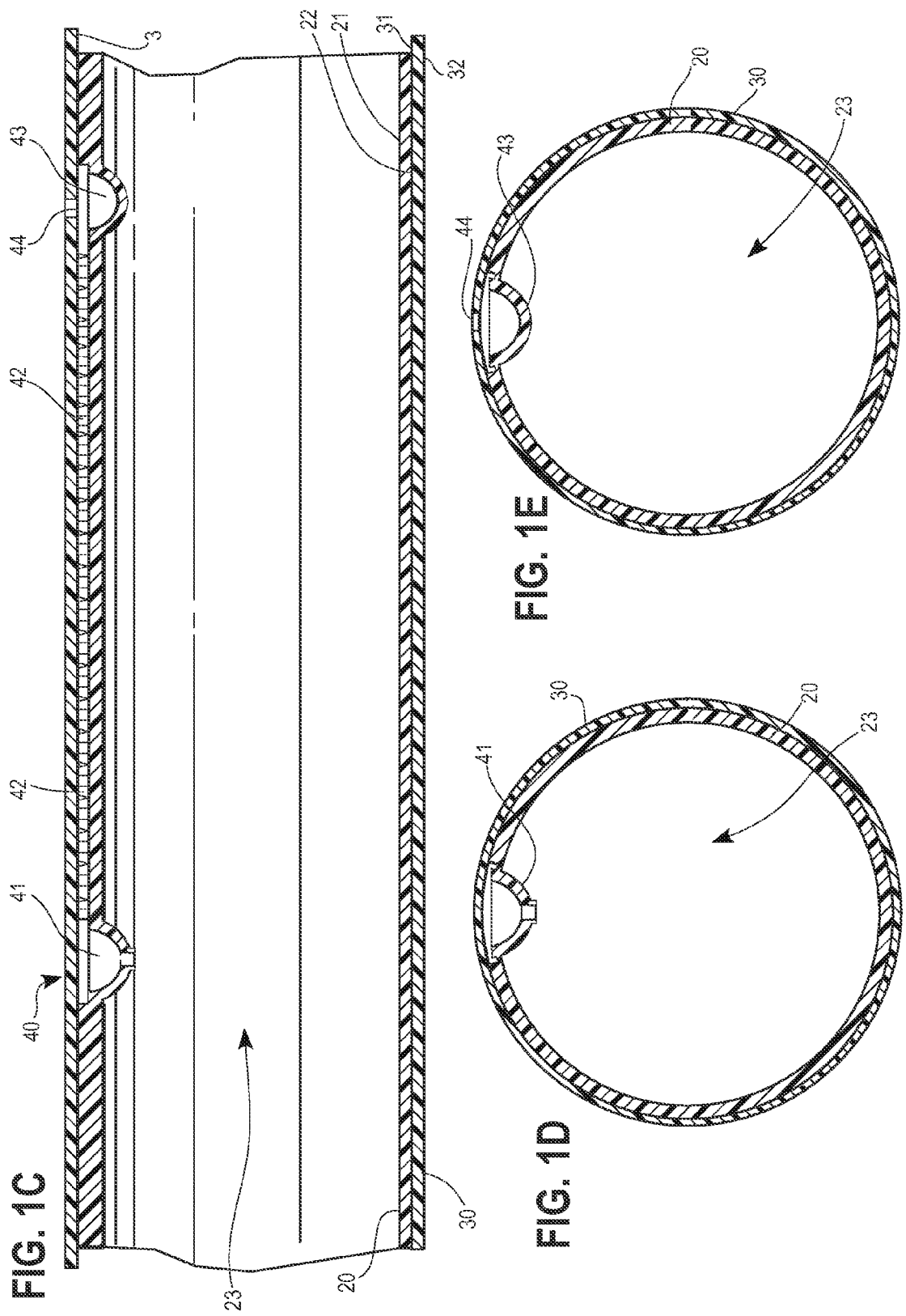

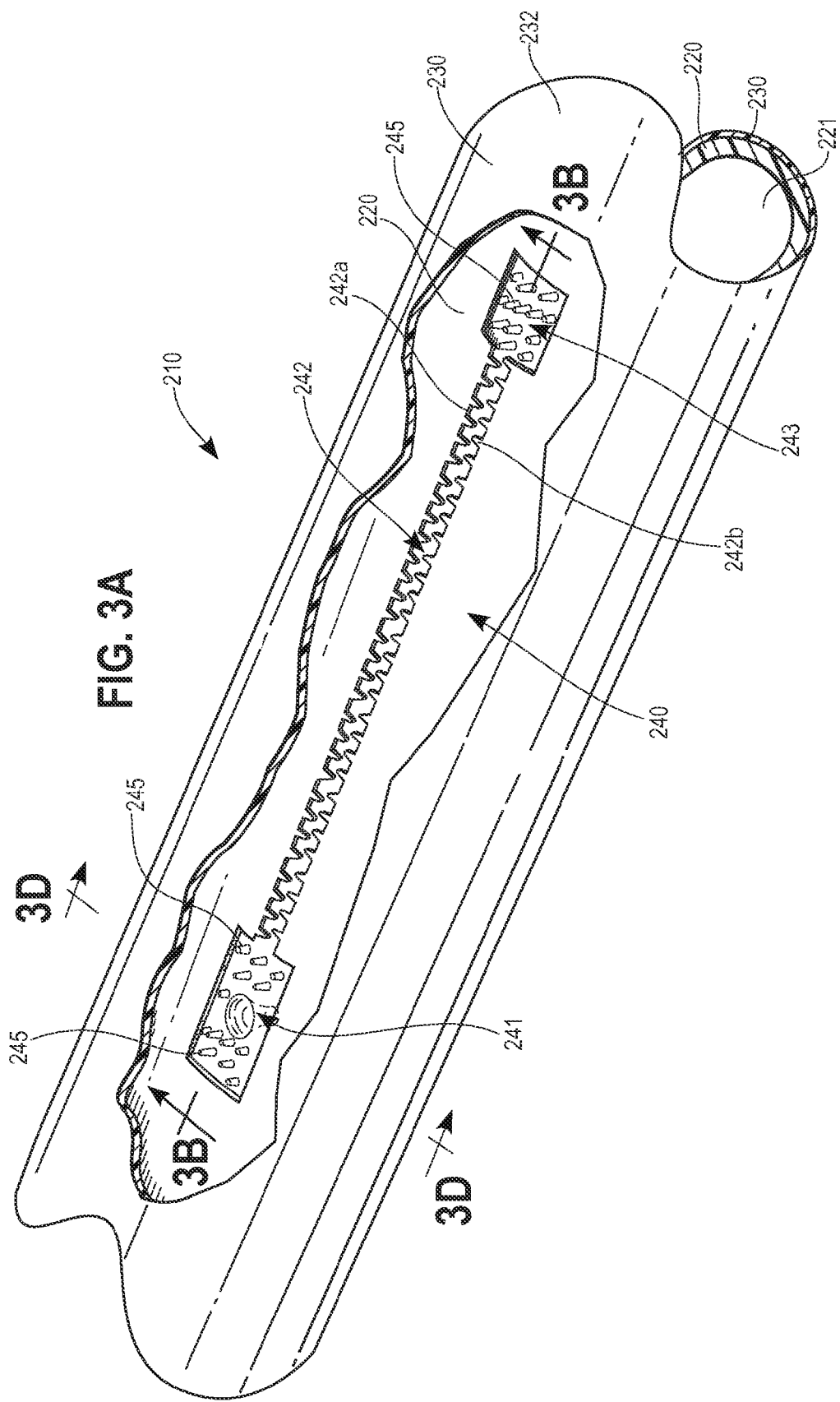

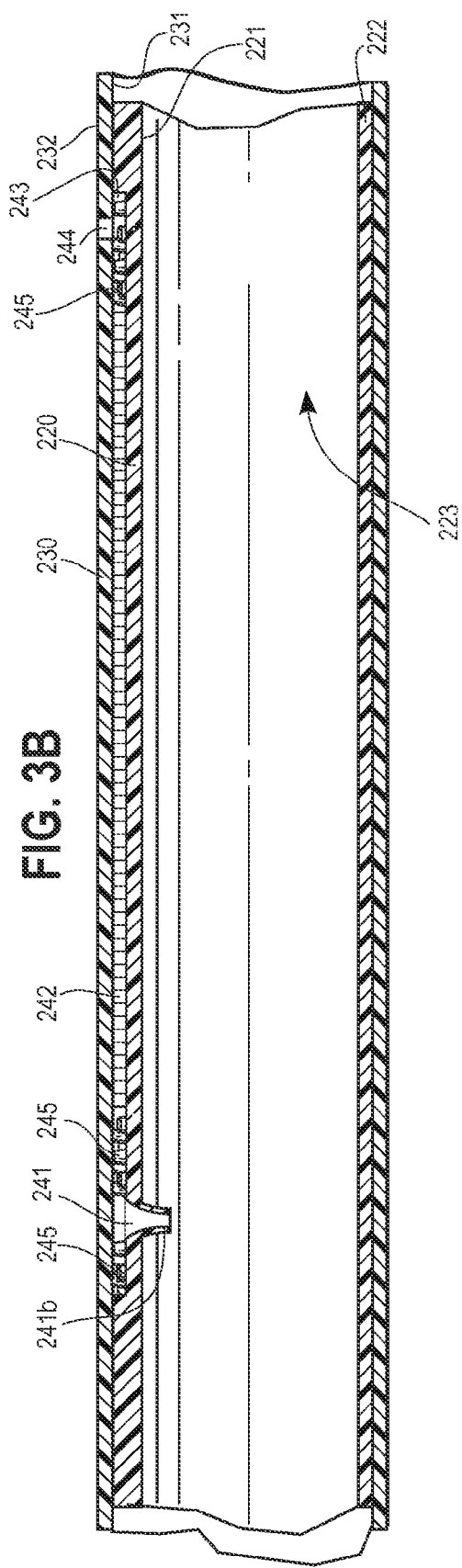
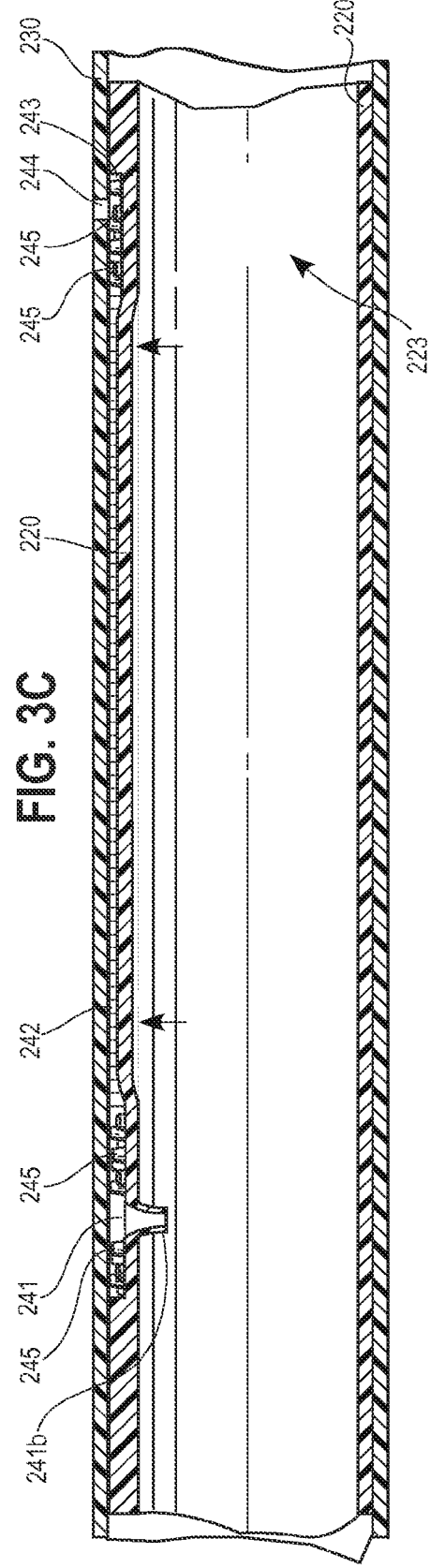

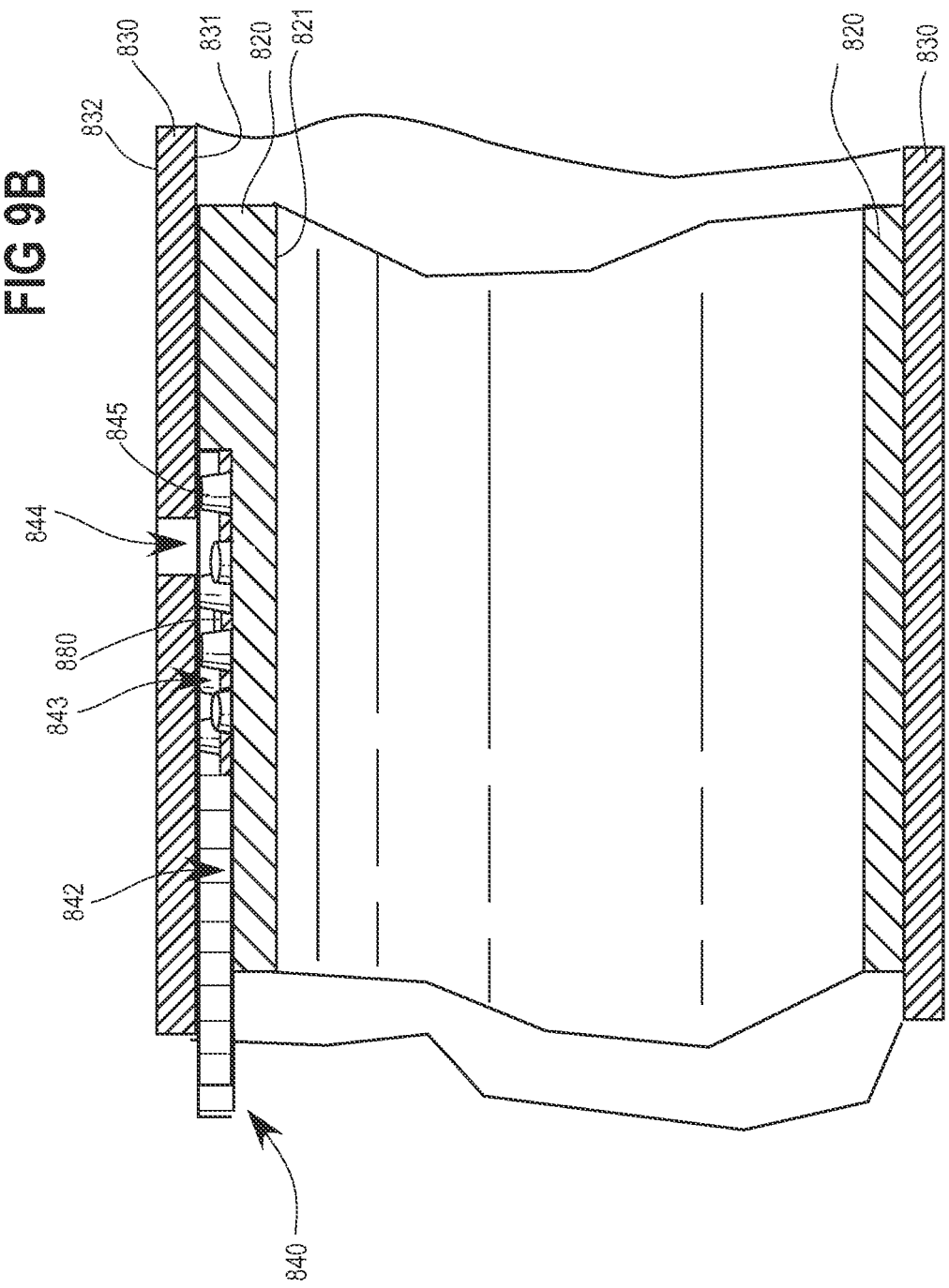

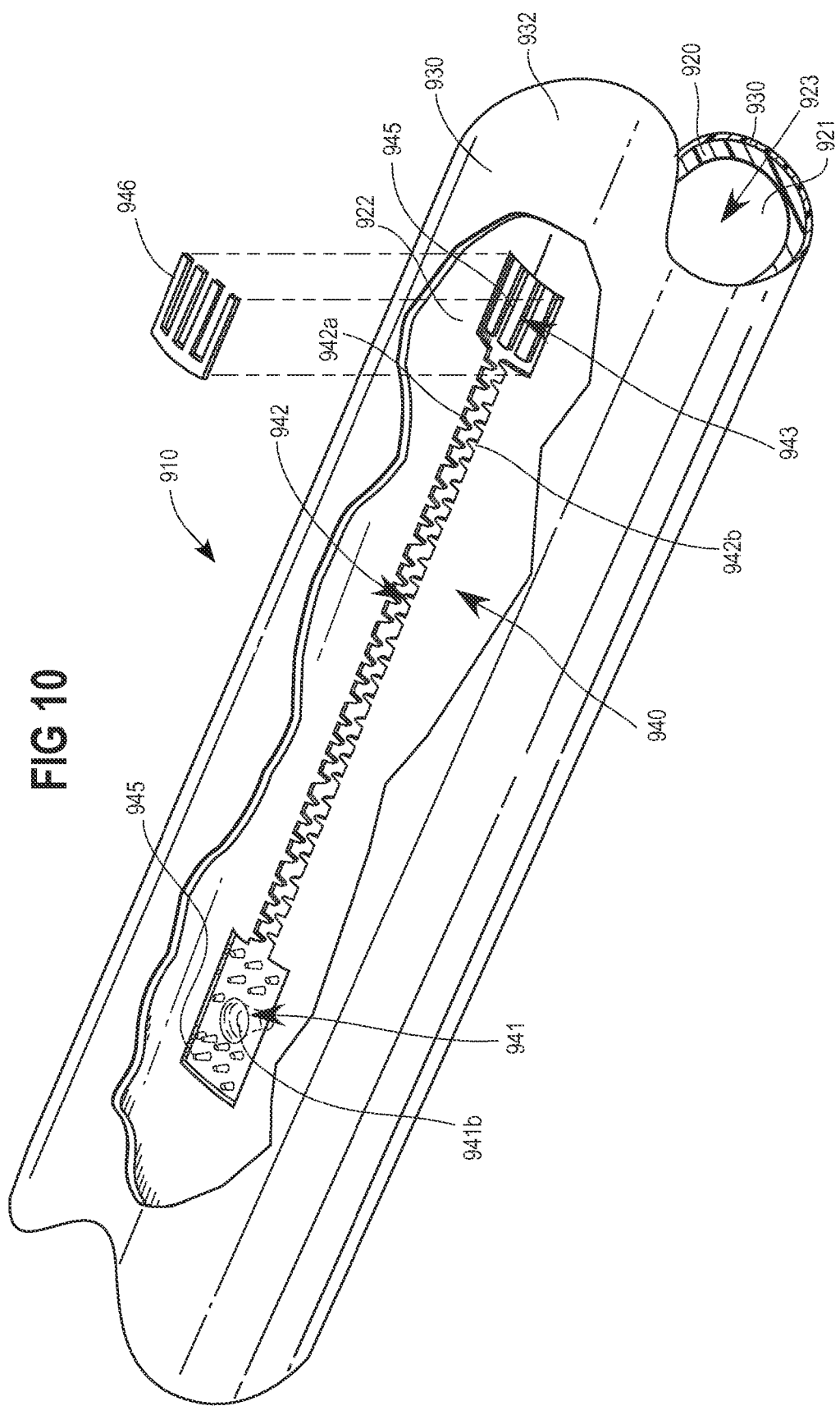

DRIP LINE EMITTER AND METHODS RELATING TO SAME

CROSS-REFERENCE TO RELATED APPLICATION

This application is a continuation-in-part application of U.S. patent application Ser. No. 13/430,308, filed Mar. 26, 2012, which is incorporated by reference herein in its entirety.

FIELD

The present invention relates to irrigation drip lines and emitters, and more particularly, to irrigation drip lines with multiple drip emitters forming an irrigation assembly or system.

BACKGROUND

Irrigation drip emitters are commonly used in irrigation systems to convert fluid flowing through a supply tube or drip line at a relatively high flow rate to a relatively low flow rate at the outlet of each emitter. Such emitters are typically used in landscaping (both residential and commercial) to water and/or treat (e.g., fertilize) trees, shrubs, flowers, grass and other vegetation, and in agricultural applications to water and/or treat crops. Typically, multiple drip emitters are positioned on the inside or outside of a water supply line or tube at predetermined intervals to distribute water and/or other fluids at precise points to surrounding land and vegetation. The emitter normally includes a pressure reducing passageway, such as a zigzag labyrinth or passage, which reduces high pressure fluid entering the drip emitter into relatively low pressure fluid exiting the drip emitter. Generally, such drip emitters are formed in one of three common manners: (1) separate structures connected to a supply tube either internally (i.e., in-line emitters) or externally (i.e., on-line emitters or branch emitters); (2) drip strips or tape either connected to an inner surface of a supply tube or in-between ends of a material to form a generally round supply tube or conduit; and (3) stamped into a surface of a material that is then folded over upon itself or that overlaps itself to form a drip line with an enclosed emitter.

With respect to the first type of common drip emitter, the emitter is constructed of a separate housing that is attached to the drip line. The housing is normally a multi-piece structure that when assembled defines the pressure reducing flow path that the fluid travels through to reduce its pressure. Some examples of in-line emitters that are bonded to an inner surface of the supply line or tube are illustrated in U.S. Pat. No. 7,648,085 issued Jan. 19, 2010 and U.S. Patent Application Publication No. 2010/0282873, published Nov. 11, 2010, and some examples of on-line emitters which are connected to an exterior surface of the supply line or tube (usually by way of puncture via a barbed end) are illustrated in U.S. Pat. No. 5,820,029 issued Oct. 13, 1998. Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

With respect to the second type of emitter, (i.e., drip strips or tape), the emitter is typically formed at predetermined intervals along a long stretch of material which is either bonded to the inner surface of the supply line or connected between ends of a material to form a generally round conduit or supply line with the strip or tape running the longitudinal length of the conduit. Some examples of drip strips or tape type emitters are illustrated in U.S. Pat. No. 4,726,520 issued Feb. 23, 1988.

With respect to the third type of emitter, (i.e., folded or overlapping tube emitters), the emitter is typically formed by stamping a pressure reducing flow path on one surface of a tube making material at or near an end thereof which is then folded back over on itself or which is wrapped such that the opposite end of the tube making material overlaps the end with the stamped flow path to form an enclosed pressure-reducing passageway. Some examples of folded or overlapping tube emitters are illustrated in U.S. Pat. No. 4,726,520 issued Feb. 23, 1988, and International Patent Application Publication No. WO 00/01219 published Jan. 13, 2000.

In addition, many if not all of the above mentioned emitters can be manufactured with a pressure compensating mechanism that allows the emitters to adjust or compensate for fluctuations in the fluid pressure within the supply line. For example, some of the above emitters include separate elastomeric diaphragms which are positioned adjacent the pressure reducing passageway and help reduce the cross-section of the passageway when an increase in supply line fluid pressure occurs and increase the cross-section of the passageway when a decrease in the supply line fluid pressure occurs.

While each of these forms of emitters has its own advantage, they each require either multiple pieces to be assembled, aligned and carefully bonded to the supply line or intricate stamping and folding or overlapping to be performed in order to manufacture the emitter and ensure that the emitter operates as desired. Thus, these emitters often require more time and care to assemble which needlessly can slow down the production of the drip line and/or emitter and can increase the cost of the drip line and/or emitter as well. Thus, there is a need for a simpler emitter construction that can be manufactured faster and using fewer parts and without wasting as much time, energy and materials related to aligning and assembling multiple parts of the emitter and/or folding or overlapping materials.

In addition, some of the above-mentioned emitters introduce structures (sometimes even the entire emitter body) into the main lumen of the supply line or tube which can cause turbulence and result in later emitters or emitters further downstream not working as well or efficiently as earlier emitters or upstream emitters. For example, in some of the non-pressure compensated emitters the introduction of too much turbulence from emitter structures located upstream can reduce the pressure of the fluid further downstream and result in the downstream emitters trickling water at a different flow rate than upstream emitters. This is not normally desirable as in most applications it would be desirable that the emitters of the drip line saturate their respective surrounding area at a common flow rate rather than having one portion of the drip line saturate one area more than another portion of the drip line saturates another area.

In other in-line emitters, large cylindrical structures are used which interfere with the flow of the fluid traveling through the drip line or tube and introduce more turbulence to the fluid or system due to the fact they cover and extend inward from the entire inner surface of the drip line or tube. The increased mass of the cylindrical unit and the fact it extends about the entire inner surface of the drip line or tube also increases the likelihood that the emitter will get clogged with grit or other particulates (which are more typically present at the wall portion of the tube or line than in the middle of the tube or line) and/or that the emitter itself will form a surface upon which grit or particulates can build-up on inside the drip line and slow the flow of fluid through the drip line or reduce the efficiency of the fluid flowing therethrough. Thus, there is also a need to reduce the size of in-line emitters and improve the efficiency of the systems within which these items are mounted.

Thus, there is a need for a new drip line and/or emitter that does not introduce structures into the central or main lumen of the supply line or drip line, that does not introduce turbulence into the system and/or that does not provide a surface for grit to build-up on, all of which could affect the operation of the drip line or emitters and, particularly, negatively affect the operation of downstream emitters. Providing such an emitter with a pressure compensating feature would also be desirable.

As mentioned above, some emitters can be positioned within the supply line or drip line so that the supply line can be buried underground (i.e., subsurface applications). In addition to the advantages of in-line emitters, subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations.

Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present.

Third, subsurface emitters are not easily vandalized, given their installation in a relatively inaccessible location, i.e., underground. Thus, use of such subsurface emitters results in reduced costs associated with replacing vandalized equipment and with monitoring for the occurrence of such vandalism. For instance, use of subsurface emitters may lessen the costs associated with maintenance of publicly accessible areas, such as parks, school grounds, and landscaping around commercial buildings and parking lots.

Fourth, the use of subsurface drip emitters can prevent the distribution of water to undesired terrain, such as roadways and walkways. More specifically, the use of subsurface drip emitters prevents undesirable "overspray." In contrast, above-ground emitters often generate overspray that disturbs vehicles and/or pedestrians. The above-identified advantages are only illustrative; other advantages exist in connection with the use of subsurface drip emitters.

One problem associated with using conventional emitters in subsurface applications is that they are prone to obstruction due to grit build-up and root growth. With respect to the latter, conventional emitters typically have difficulty in being used in at least sub-surface applications due to root obstruction that occurs from plants or vegetation growing toward the emitter creating an obstruction to the normal flow of fluid through the emitter. In the past, chemicals have been devised for use with sub-surface irrigation equipment to inhibit such root growth/interference, but these chemicals are either expensive to use or damaging to other materials used in the irrigation system (e.g., tubing, couplings, valves, the emitter itself, etc.).

Although some advantages of subsurface emitters are described above, it would be desirable to provide an improved drip emitter design that can be used in both subsurface and above ground applications that provides relatively constant fluid output from each of the emitters in the irrigation system without the problems associated with conventional emitters (e.g., negative effects of turbulence and grit build-up associated with emitters that project into the central or main lumen of the supply line, multi-part construction requiring alignment and assembly, complex folding/overlaying, root obstruction, etc.).

Accordingly, it has been determined that the need exists for an improved emitter construction and/or drip line and methods relating to same which overcomes the aforementioned limitations and which further provides capabilities, features and functions, not available in current drip lines or emitters and methods.

BRIEF DESCRIPTION OF THE DRAWINGS

The above and other aspects, features and advantages of several embodiments of the present invention will be more apparent from the following more particular description thereof, presented in conjunction with the following drawings.

FIG. 1A is a perspective view of a drip line and emitter embodying features of the present invention, with an outer layer of the drip line cutaway so that the emitter is visible for purposes of discussion;

FIG. 1B is an enlarged view of the outlet and adjacent pressure-reducing flow channel of the emitter and drip line of FIG. 1A, illustrating a closer view of the baffle walls and teeth that make-up a portion of the pressure-reducing flow channel;

FIG. 1C is a cross-sectional view of the drip line and emitter of FIG. 1A taken along line 1C-1C, but illustrating the outer layer of the drip line that was cut out of FIG. 1A;

FIGS. 1D-E are cross-sectional views of the drip line and emitter of FIG. 1A taken along lines 1D-1D and 1E-1E, respectively, with FIG. 1D illustrating a cross-sectional view of the inlet-end of the emitter and FIG. 1E illustrating a cross-sectional view of the outlet-end of the emitter;

FIG. 3A is a perspective view of an alternate drip line and emitter embodying features of the present invention, with an outer layer of the drip line cutaway so that the emitter is visible;

FIG. 3B is a cross-sectional view of the alternate drip line and emitter taken along lines 3B-3B in FIG. 3A and illustrating the floor of the pressure-reducing flow channel subject to low supply line fluid pressure;

FIG. 3C is a cross-section view of the alternate drip line and emitter of FIG. 3A taken along line 3C-3C in FIG. 3A and illustrating the floor of the pressure-reducing flow channel subject to a higher supply line fluid pressure sufficient to push the floor up into the flow channel thereby reducing the cross-sectional area of the flow channel to compensate for the increase in supply line fluid pressure;

FIGS. 9A-B are perspective and partial cross-sectional views of an alternate drip line and emitter embodying features of the present invention in which a root growth inhibiting member is disposed proximate the emitter to disrupt root growth that could interfere with the operation of the emitter with FIG. 9B being a partial cross-sectional view of the drip line and emitter taken along lines 9B-9B in FIG. 9A; and FIG. 10 is a perspective view of an alternate drip line and emitter embodying features of the present invention in which another root growth inhibiting member is disposed proximate the emitter to disrupt root growth that could interfere with the operation of the emitter.

Figure 2A:
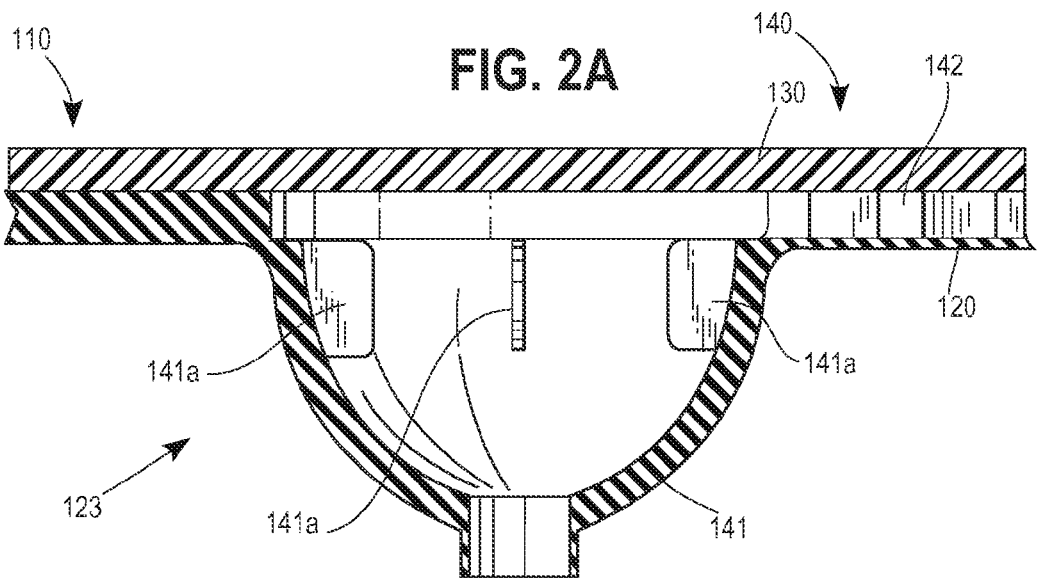
FIGS. 2A-C are cross-sectional views of an alternate inlet embodiment taken from the same perspective as the cross-sectional inlet view illustrated in FIG. 1A, with FIG. 2A illustrating the inlet opening subjected to low fluid pressure, FIG. 2B illustrating the inlet opening subjected to higher fluid pressure sufficient to cause the inlet dome to partially collapse on itself as a means for compensating for fluid pressure fluctuations in the supply line or drip line, and FIG. 2C illustrating the inlet opening subjected to even higher fluid pressure sufficient to cause the inlet dome to more fully collapse on itself (but not totally collapsing so that fluid can still flow through the emitter) as a means for compensating for fluid pressure fluctuations in the supply line or drip line.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE PREFERRED EMBODIMENTS

As shown in FIGS. 1A-E, an irrigation drip line 10 is provided for distributing water from a fluid supply source via a plurality of emitters 40 so that some of the pressurized fluid from the fluid supply source can be trickled out from the emitters 40 at a low flow rate to surrounding landscape or vegetation. In a preferred form, the drip line 10 carries pressurized fluid throughout an irrigation system and preferably includes numerous emitters 40 spaced apart at predetermined intervals in the dip line 10 in order to allow the drip line 10 to be placed above or below ground to water and/or treat grass, plants, shrubs, trees or other landscaping, or to water agricultural crops of various kinds.

In the form illustrated, the drip line 10 and emitter 40 are formed by two concentric tubes 20 and 30, respectively. The first tube or inner tube 20 is extruded to form a generally cylindrical tube with inner and outer circumferential surfaces 21 and 22, respectively, and an inner lumen 23 through which the pressurized fluid travels. The first tube 20 further defines a plurality of emitter bodies spaced apart at predetermined intervals with each emitter body having an inlet 41, pressure-reducing flow channel or passage 42 and outlet pool or area 43. In a preferred form, the emitter bodies (including inlets 41, flow channels 42 and outlet pools 43) are embossed in the outer surface 22 of the extruded tube via an embossing wheel or press capable of stamping or pressing the emitter items 41, 42 and 43 into the exterior 22 of the first extruded tube 20 at the desired interval.

After the emitter items are embossed into the exterior 22 of first extruded tube 20, the second tube or jacket 30 is extruded over the first tube 20 enclosing the passageway formed between the inlet 41, flow channel 42 and outlet pool 43 below the inner surface 31 of second tube 30 and leaving only the exterior 32 of second tube 30 visible from the outside of the drip line 10. An opening or bore 44 is made through the second extruded tube 30 proximate the outlet pool 43 so that the flow channel 42 connects the inlet 41 and outlet 44 to form an emitter 40 which will reduce the fluid pressure and flow rate of the fluid passing through the emitter 40. In a preferred form, the second tube 30 seals the first tube and emitter elements 41, 42 and 43 to create a fluid tight passage between the inlet 41 and outlet 44.

In the forms illustrated, the inlet 41 and outlet pool 43 are pressed further into the inner lumen 23 of the first tube 20 than the flow channel 42 to form collecting areas (e.g., baths, pools, etc.) for the fluid passing through the emitter 40 and, in the case of the inlet 41, to allow the inlet 41 to draw fluid from a region other than at a circumferential periphery of the lumen 23 adjacent the inner surface 21 of the first tube 20. Since larger grit and other particulates or particles found in the fluid traveling through the drip line 10 tend to stay near the inside wall 21 of the first tube 20, having the inlet project further into or toward the center of the lumen 23 helps reduce the likelihood that such larger grit or other particulates will enter into and/or clog emitter 40 or prevent it from performing as desired. In addition, by only making the inlet 41 and/or outlet pool 43 extend into the inner lumen 23, the amount of emitter 40 projecting into the lumen 23 is reduced compared to conventional in-line emitters which have their entire body disposed within the drip line, thereby minimizing the amount of interference the emitter 40 introduces into the fluid flowing through the drip line 10 (e.g., turbulence, fluid flow obstruction or increased frictional surface area, etc.).

While the inlet 41 and outlet 44 are shown in a bulbous dome or inverted dome-like form, it should be understood that in alternate forms, these structures may be provided in a variety of different shapes and sizes. For example, as will be discussed further below with respect to FIGS. 3A-D, the inlet and outlet areas may alternatively be rectangular in shape and the inlet may have a funnel-shaped projection or tapering protrusion that allows it to draw fluid closer to the center of the lumen 23 or from a region other then the circumferential periphery of the inner lumen 23. The tapering shape of the inlet further helping to reduce the amount of interference or noise the inlet and, thus, emitter introduces into the fluid flowing through the emitter and/or drip line. In yet other forms, the emitter 40 may be designed so that only one of the inlet 41 and outlet pool 43, or neither, extend into the inner lumen 23 of first tube 20 in order to further reduce the amount of interference (e.g., turbulence, etc.) the emitter 40 causes to the fluid flowing through the drip line 10.

Similarly, while the openings of inlet 41 and outlet 44 shown in FIGS. 1A-E are in the form of round bores, holes or bosses, it should be appreciated that in alternate embodiments the inlet opening and/or outlet opening may take on various different shapes and sizes to accommodate any application. For example, in one form the inlet opening and/or outlet opening may be in the shape of a narrow slit or slot-type opening, or a plurality of slot type openings, through which fluid is allowed to flow. Some of these designs, such as the plurality of slot openings, may be chosen to assist the emitter 40 in deflecting grit and other particulates away from the emitter so that the particulates cannot flow through, clog or interfere with the operation of emitter 40 or drip line 10. In another form, the inlet opening and/or outlet opening may take on a zigzag tortuous passage shape to further help reduce fluid pressure and flow rate of the fluid entering and/or exiting the emitter 40.

As best illustrated in FIG. 1B, the pressure-reducing flow channel 42 preferably comprises a tortuous passage defined by opposing baffle walls 42a and 42b, respectively. The baffle walls 42a, 42b define teeth that force the fluid to zigzag back and forth through the passage 41; losing fluid pressure with each turn before emptying into the larger outlet area 43 (the transition from smaller passage to larger pool further causing an additional pressure drop). In the form illustrated, the tube 20 is flattened as it is embossed, thus, when the tube is re-formed into a cylindrical tube shape after the embossing process the flow channel 42 (along with inlet 41 and outlet area 43) becomes curved in accordance with the radius of curvature of tube 20. This curvature causes the distance between the baffle walls to be closer at the bottom of the flow path (or inner most surface of the flow path) and wider at the top (or outer most surface of the flow path). Meaning the baffle walls will likely not be parallel to one another because of the radius of curvature of the tube 20 and flow path 42, unless this radius of curvature is accounted for when embossing the emitter elements 41, 42 and 43. In addition, in the form illustrated, the upper edge of the teeth is also tapered. It should be understood, however, that in alternate embodiments the flow channel 42 (including its baffle walls, teeth, etc.) may be designed with a variety of different shapes and sizes. For example, in other forms the tortuous passage may define a more curved passageway instead of using a saw tooth type pattern and/or the teeth may have upstream and downstream faces that are not parallel to one another to further assist in pressure reduction. In addition, greater distance may be provided between the baffle walls and/or the distal ends of the teeth to provide a central flow path that allows some of the fluid to flow faster through a portion of the pressure-reducing passage 42 and help clear out grit or other possible obstructions.

In the form illustrated in FIGS. 1A-E, the concentric tubes 20, 30 have a continuous wall thickness (with the exception of the emitter portion 40). The first tube 20 preferably has a continuous thickness of twenty thousandths or twenty-five thousandths of an inch (i.e., 0.020" or 0.025") and the second tube 30 preferably has a continuous thickness of fifteen thousandths of an inch (i.e., 0.015") for a total thickness of forty thousandths of an inch (i.e., 0.040"). The channel stamped into the outer diameter of the first tube 20 has a depth that is less than the thickness of the first tube 20 and the inlet extends into the inner lumen 23 (i.e., from the inner diameter of tube 20 to the distal end of the inlet) by an additional ninety-eight thousandths of an inch (0.098"). In addition, the inlet and outlet openings are preferably positioned approximately 3.2" apart from one another and the outer diameter of the jacket 30 is seven-hundred five thousandths of an inch (0.705"). All of these dimensions having a preferred predetermined tolerance (e.g., ±0.030", ±0.015", ±0.005", ±1°, ±0.5°, etc.). In alternate forms, however, these dimensions and tolerances may vary depending on the intended application (e.g., residential usage, agricultural usage, commercial or municipal usage, more specific types of applications than these, etc.). For example, in some forms the thickness of the walls may be as thin as ten thousandths of an inch (0.010") and as thick as ninety thousandths of an inch (0.090"), but in a preferred form will range between fifteen thousandths of an inch (0.015") and sixty thousandths of an inch (0.060").

In a preferred form, the thickness of the tubes 20 and 30 is selected so that the completed drip line looks similar to conventional drip line and has a similar wall thickness or inner and outer diameters to conventional drip lines so that the finished product or completed drip line can be used in all conventional irrigation applications and with existing irrigation accessories such as barbed fittings, compression fittings, clamps, stakes, end caps, etc. For example, in one form, inner tube 20 may be designed with a thickness of thirty thousandths of an inch (0.030") and the jacket 30 with a thickness of ten to fifteen thousandths of an inch (0.010"-0.015") for a total thickness of forty thousandths to forty-five thousands of an inch (0.040"-0.045"), which is a sufficiently thin enough wall thickness to allow for barbed fittings and the like to be used to puncture the drip line where desired. In this form, the passage 42 is stamped into the outer surface of the first tube 20 and has a depth of approximately twenty thousandths to twenty-five thousandths of an inch (0.020" to 0.025") which is then sealed (with the exception of predetermined outlet openings) by outer tube or jacket 30.

In other embodiments, different dimensions may be selected in order to form an entirely new line or type of drip line with different diameters and wall thicknesses if desired. In addition, it should be understood that in alternate embodiments, the drip line 10 and emitter 40 may be provided with an additional pressure compensating feature if desired. For example, in FIGS. 2A-C, enlarged cross-sectional views of emitter inputs are illustrated for an alternate drip line. For convenience, items which are similar to those discussed above with respect to drip line 10 in FIGS. 1A-E will be identified using the same two digit reference numeral in combination with the prefix "1" merely to distinguish one embodiment from the other. Thus, the inlet of the drip line of FIGS. 2A-C is identified using the reference numeral 141 since it is similar to inlet 41 discussed above with respect to FIGS. 1A-E.

Figure 2B:
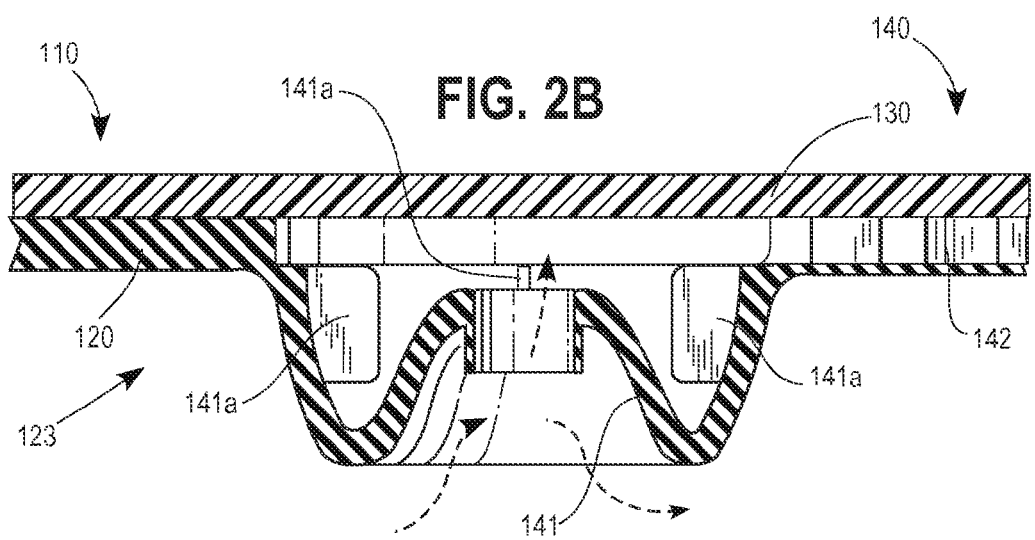
Figure 2C:
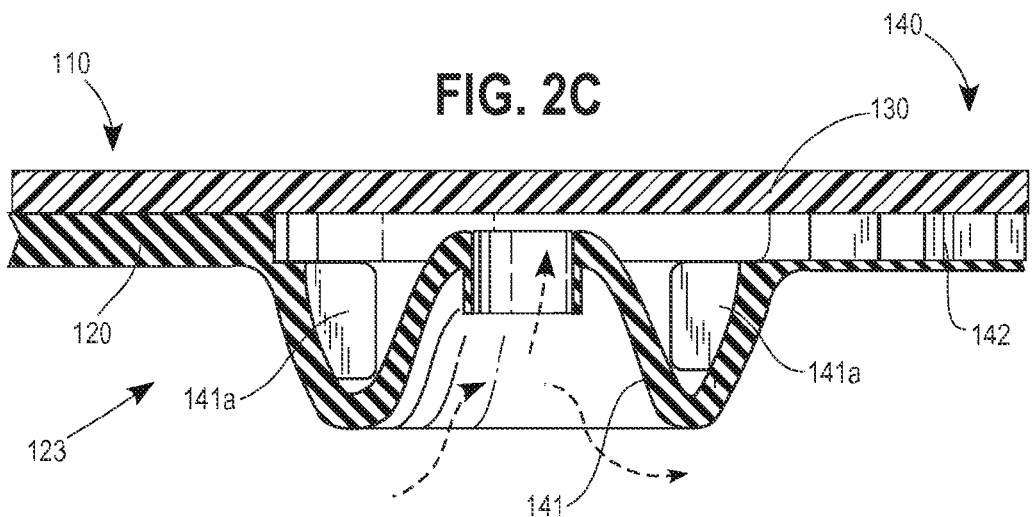

In the form illustrated in FIGS. 2A-C, the first tube layer 120 of drip line 110 is made of an elastomeric material, such as a thermoplastic or thermosetting elastomeric material like materials that use ethylene, propylene, styrene, PVC, nitrile, natural rubber, silicone, etc., to form a polymer or copolymer. In a preferred form, the elastomeric material is made of thermoplastic polyolefin (TPO) and silicone rubber, which allows the inlet 141 of emitter 140 to collapse in on itself in response to increased fluid pressure to reduce the amount of fluid that can flow through the emitter 140 and, thereby, compensate for supply line fluid pressure increases. In a preferred form, the TPO material allows the dome of inlet 141 to gradually move from a first position, such as the low pressure, expanded or normal position illustrated in FIG. 2A, to a second position, such as the high pressure collapsed position illustrated in FIG. 2C in response to increasing supply line fluid pressure, rather than the inlet dome 141 retaining its shape until a predetermined amount of pressure is reached and then quickly collapsing. To assist in this regard, structural support members, such as ribs 141a, may be provided to help the inlet dome 141 make such a gradual transition between its normal, low pressure position (FIG. 2A) and its more fully collapsed, high pressure position (FIG. 2C). Thus, as fluid pressure increases, the inlet dome 141 will gradually move from its normal position (FIG. 2A), toward an intermediate position (FIG. 2B) and, ultimately, to its more fully collapsed position (FIG. 2C) when the fluid pressure reaches a predetermined level. The ribs 141a are also designed as an obstruction or stop for preventing the inlet dome 141 from collapsing so fully on itself as to stop the flow of fluid through emitter 141. When pressure decreases, the dome inlet 141 gradually returns to its normal, low pressure shape as illustrated in FIG. 2A by moving from its more fully collapsed position (FIG. 2C) toward its intermediate position (FIG. 2B) and then, eventually, back to the normal position (FIG. 2A) once the fluid pressure has dropped below a predetermined level. In this regard, the dome inlet 141 allows drip line 110 to compensate for fluctuations in supply line fluid pressure by moving between the positions illustrated in FIGS. 2A-C as supply line fluid pressure increases and decreases.

It should be understood that in alternate embodiments, the ribs 141a or alternate support structures may be placed on the outside surface of the inlet dome 141 exposed to the supply line fluid flowing through inner lumen 123 rather than on the inside surface of inlet dome 141. In addition, other types of support structures or framing, such as internal or external latticework, endoskeletons or exoskeletons, etc., may be used to accomplish either the task of allowing gradual transition of the inlet dome between its low pressure position (FIG. 2A) and its high pressure position (FIG. 2C) or the task of preventing the inlet dome from fully collapsing on itself and preventing fluid from flowing through emitter 140. In still other embodiments, no support structures may be used. This may be in situations where the dome material itself is enough to ensure the gradual transition between low and high pressure positions (FIGS. 2A, 2C respectively), or in situations where a quicker transition is desired between low pressure and high pressure positions (e.g., such as the situation discussed above where the dome retains its lower pressure shape, FIG. 2A, until a predetermined pressure is reached and then immediately collapses to its high pressure position, FIG. 2C, without going through a gradual transition).

Although a dome has been illustrated for the inlets 41 and 141 of FIGS. 1A-E and FIGS. 2A-C, respectively, it should be understood that the inlet may be provided in a variety of different shapes and sizes and does not have to play a role in pressure compensation. Similarly, in other forms, the drip emitter may be constructed of tubes of varying wall thickness rather than of uniform thickness as shown in FIGS. 1A-E and 2A-C. For example, in FIGS. 3A-D, an alternate form of drip line is illustrated having an inlet opening with a rectangular and funnel shape inlet and having an inner tube with a varying wall thickness. As with the above-described alternate embodiment, items of the alternate embodiment of FIGS. 3A-D which are similar to those discussed above with respect to drip lines 10, 110 in FIGS. 1A-E and 2A-C will be identified using the same two digit reference numeral in combination with the prefix "2" merely to distinguish one embodiment from the other. Thus, in FIGS. 3A-D, the drip line and emitter will be identified using reference numerals 210 and 240 since they are similar to the drip lines 10, 110 and emitters 40, 140 discussed above with respect to FIGS. 1A-E and 2A-C, respectively.

In the form illustrated in FIGS. 3A-D, the inner tube 220 of drip line 210 is stamped or embossed with an emitter 240 having a generally rectangular inlet 241 that has a funnel shaped portion 241b extending from the rectangular portion of the inlet 241 further into the lumen 223 so that fluid is drawn from a region other than at a circumferential perimeter of lumen 223 and away from the inner wall 221 of tube 220 where grit and other particulates are less likely found (i.e., as mentioned above grit and particulates that can clog the emitter are more frequently found near the inner wall 221 of inner tube 220).

In this form, the funnel shaped inlet 241 does not collapse on itself to form a pressure-compensating structure, but rather the floor of pressure-reducing flow channel 242 deflects into the flow channel 242 to reduce the cross-section of the flow channel 242 in response to increases in supply line fluid pressure, thereby compensating for pressure increases. As best illustrated in FIG. 3B, at low fluid pressures, the floor of the flow channel 242 remains at its normal position wherein the cross-section of the flow channel is maximized to allow as much fluid as possible to flow through the flow channel 242 and into outlet 243. As fluid pressure increases, the floor of flow channel increasingly deflects into the flow channel 242, as illustrated in FIG. 3C, thereby reducing the cross-section of the flow channel 242 and limiting the amount of fluid that is allowed to pass through the flow channel 242 and into outlet 243. In a preferred form, the deflection of the floor of flow channel 242 will not be enough to fully close or collapse the flow channel 242 and prevent all fluid from passing through the emitter 240, however, the floor of the flow channel 242 will gradually deflect further and further into the flow channel 242 as the fluid pressure increases; thereby reducing the cross-section of the flow channel 242 and limiting the amount of fluid that can flow therethrough in order to compensate for fluid pressure increases. Conversely, as fluid pressure decreases, the floor of flow channel 242 will gradually return more and more toward its normal position (i.e., FIG. 3B) to allow more fluid to flow through the emitter 240. Thus, in this way, the emitter 240 and drip line 210 are capable of compensating for fluctuations in fluid pressure.

Obstructions, such as stops 245, are used to prevent the inlet 241 and outlet pool 243 from collapsing in on themselves. In the form illustrated the stops 245 are in the form of projections or posts that extend up from the floor of the inlet 241 and outlet 245 and are formed during the embossing process. If desired, the posts 245 may be spaced apart from one another by an amount sufficient to allow the floor of the inlet 241 and outlet pool 243 to deflect inwards and reduce the cross-section of the inlet 241 and outlet 243, respectively, in order to further compensate for increases in supply line fluid pressure and/or assist in pressure compensation for emitter 240. In this way, the first pressure compensating mechanism of FIGS. 2A-C may be combined with the pressure compensating mechanism illustrated in FIGS. 3A-D to provide both an inlet 241 and flow channel 242 that compensate for supply line fluid pressure fluctuations and/or may be combined with a deflecting outlet 243 (which could be similar to the deflecting inlets 141 and 241 described herein) to provide yet another type of pressure compensating structure. Alternatively, posts 245 may be placed closer together to prevent the floor of inlet 241 and/or outlet 245 from deflecting inwards in response to increases in supply line fluid pressure so that the cross-section of the inlet 241 and outlet 243 remain generally constant regardless of fluid pressure fluctuations.

As with earlier embodiments, fluid traveling through the drip line 210 of FIGS. 3A-D will travel through the inner lumen 223 with some fluid passing through inlet 241, then through flow channel 242 and collecting in outlet pool 243. When the drip line 210 is manufactured, an outlet bore or boss 244 is formed in the outer tube layer 230 so that fluid can pass from the outlet pool 243 to the surrounding environment of outlet 244 via the bore extending between inner surface 231 and outer surface 232 of outer tube 230. In the form illustrated, the outlet pool 243 is generally rectangular in shape, however, just with the inlet 241, the outlet 243 may be provided in a variety of different sizes and shapes. For example, in the embodiment of FIGS. 1A-E the outlet pool 43 is pressed further into the lumen 23 of the inner tube 20. Whereas in the embodiment of FIGS. 3A-D, the outlet pool 243 does not extend into lumen 223 and allows the inner tube 220 (and therefore drip line 210) to maintain a constant inner diameter to minimize the risk of the emitter 240 adding turbulence to or interfering with the fluid passing through the lumen 223 and, thus, further helping to ensure that every emitter stamped into the drip line 210 will operate in a similar manner (e.g., ensuring the last emitter in the drip line will work as well as the first emitter). Similarly, in FIGS. 3A-D, the inlet portion that extends into the lumen 223 is minimized to just that of the funnel or frustoconical portion 241b in an effort to reduce any negative effects the emitter 240 may have on the system 210. For example, the tapered design of funnel portion 241b should minimize the amount of disturbance the emitter inlet 241 causes on the fluid passing through lumen 223 and should prevent grit or other particulates from building-up on and/or clogging the emitter and drip line or interfering with the desired performance of the emitter 240 and drip line 210.

Figure 3D:
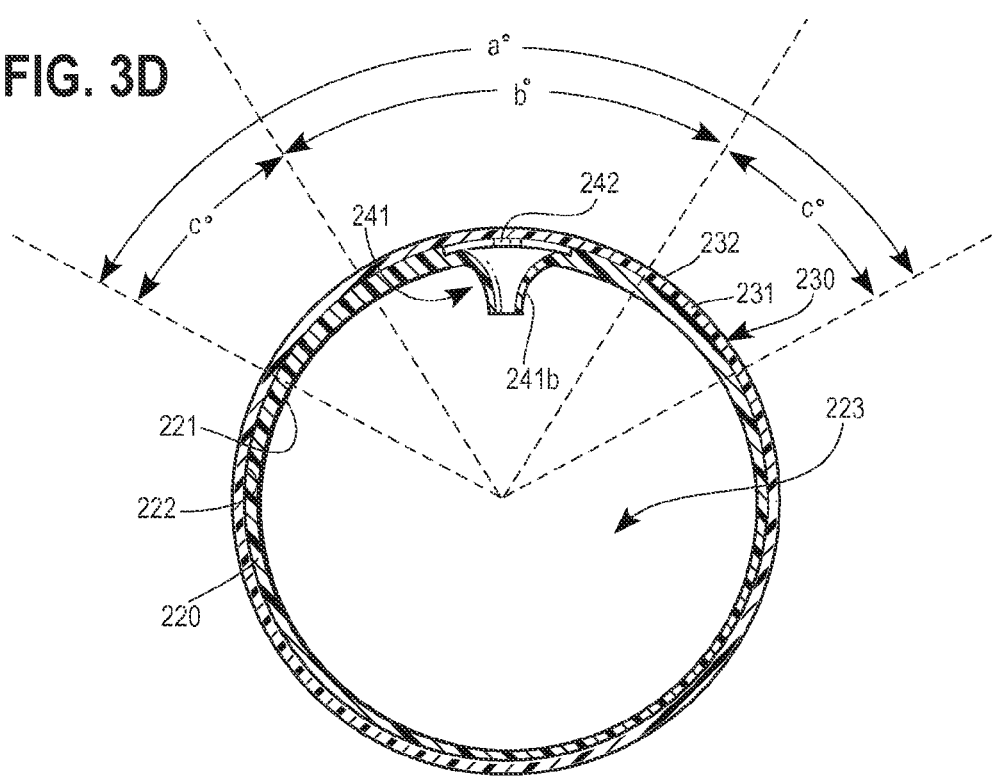
FIG. 3D is a cross-sectional view of the alternate drip line and emitter of FIG. 3A taken along line 3D-3D and illustrating one form of an inlet capable of drawing fluid from a more central portion of the supply line and illustrating a concentric tube structure wherein the inner tube has an enlarged thickness in the portion of the tube where the emitter is stamped but a reduced thickness elsewhere and the outer tube has a uniform thickness.

In the form illustrated in FIGS. 3A-D, drip line 210 is configured with an inner tube 220 that has varying wall thickness. More particularly, in the form illustrated the wall portion of tube 220 into which the emitter 240 is stamped is thicker than the wall thickness of the remaining portions of tube 220. As best illustrated in FIG. 3D, the inner tube 220 has a constant or predominantly constant wall thickness that transitions to a variable thickness portion at the upper portion of tube 220. For example, in the form illustrated a two-hundred and forty degree (240°) portion of inner tube 220 has a constant wall thickness of thirty-thousandths of an inch (0.030") while a one-hundred twenty degree (120°) portion, designated by reference a°, has a thicker wall portion. More particularly, designation b° represents an eighty degree (80°) portion where the wall thickness is at a constant increased thickness of forty-five thousandths of an inch (0.045") and designation c° represents two separate twenty degree (20°) portions (one on each side of the b° portion) wherein the wall thickness transitions from the constant smaller wall thickness of thirty thousandths of an inch (0.030") to the constant larger wall thickness of forty-five thousandths of an inch (0.045"). In the form illustrated, the outer tube 30 has a constant wall thickness of fifteen-thousandths of an inch (0.015") all the way around the tube 30. Meaning that the inner tube 20 transitions from a constant smaller thickness of fifteen thousandths of an inch (0.015") near the bottom of the drip line 210 to a constant larger thickness of thirty thousandths of an inch (0.030") at the top of the drip line 210.

It should be understood that these dimensions (e.g., degrees, inches, etc.) are simply an exemplary embodiment and that in alternate embodiments various different dimensions may be used. For example (and as mentioned above), alternate drip lines may be provided with wall thicknesses that vary anywhere from ten thousandths of an inch (0.010") to ninety thousandths of an inch (0.090") and the various degrees of each portion may be altered as desired. In addition, instead of having a one-hundred twenty degree (120°) portion of increased thickness, tube 20 may be provided with larger or smaller portions of various thicknesses (e.g., smaller thicknesses, larger thicknesses, transitioning zones of varying thicknesses, etc.) as desired for particular applications.

Some benefits of providing the inner tube 20 with a thickened wall portion is that it provides more material for the emitter to be stamped in, and so, larger flow channels (e.g., taller, wider, longer flow channels, etc.) can be provided to accommodate different intended applications for the drip line. For example, in one form the additional material provided by the thickened wall portion may be used to press a U- or other shaped flow channel into the outer surface 222 of first tube 220. Alternatively, it may be used to stamp a tapered (or tapering) flow channel 242 that either allows fluid to flow over the top of the tapered baffle portion at low supply line fluid pressure or deflects up along with the floor of the flow channel 242 as supply line fluid pressures increase to sequentially close baffles against the inside surface 231 of outer tube 230 in order to lengthen the tortuous passage defined by the flow path 242 and compensate for the increase in supply line fluid pressure. Examples of various embodiments of such movable flow channel baffle structures are disclosed in U.S. patent application Ser. No. 13/430,249 filed Mar. 26, 2012 by Ensworth et al. and entitled ELASTOMERIC EMITTER AND METHODS RELATING TO SAME, which is hereby incorporated herein by reference in its entirety. In addition, the thickened wall portion around the emitter 240 should help provide further structural support for the emitter and/or reduce the risk of cracking, tearing or other fractures/fissures forming around, on or near the emitter 240 when the drip line 210 is manufactured and/or used (whether above ground or subsurface). The added material may also allow the inlet opening to be extended further into the lumen 223 of the drip line 210 such as by way of a larger funnel or bulb inlet portion which may help reduce the likelihood of grit or other particulates from clogging the emitter or interfering with the emitter's performance. In addition, the thickened portion may simply provide for more space and material to emboss larger inlets, outlets, etc.

Figure 4A:
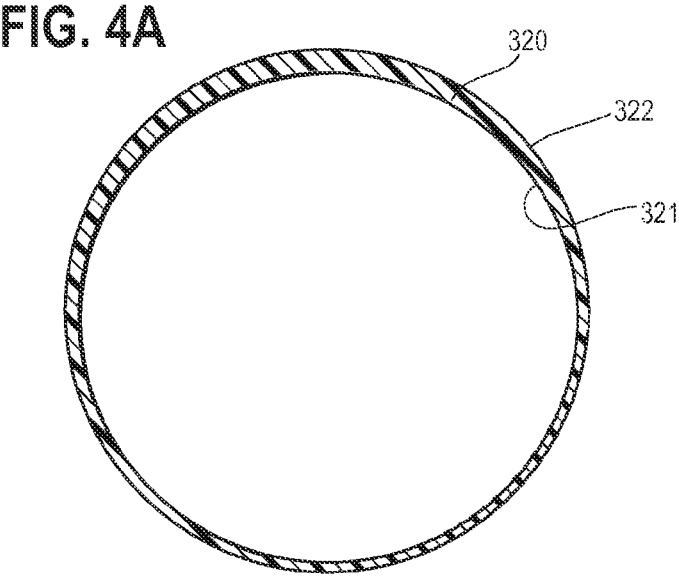
FIGS. 4A-C illustrate cross-sectional views of an alternate drip line and emitter embodying features of the present invention taken from the same perspective of FIG. 3D and at various stages of manufacture of the drip line and emitter, with FIG. 4A illustrating the inner tube of a concentric tube structure pre-stamped, FIG. 4B illustrating the tube of FIG. 4A after the emitter is stamped in the tube and showing how the thickness of the tube may be designed so that after the emitter is stamped in the tube the inner tube has a generally uniform thickness, and FIG. 4C illustrating an outer tube extruded over the inner tube of uniform thickness and a thickness that is smaller than that of the inner tube thickness.

It should also be understood that in alternate embodiments, various different combinations of constant and variable wall thickness may be used as desired. For example, in FIGS. 4A-C, a drip line is illustrated at various stages of its manufacture in which the inner tube 320 goes from being a tube of variable wall thickness to a tube of generally constant wall thickness after the emitter is pressed into the outers surface 321 of inner tube 320. More particularly, in FIG. 4A, an inner tube 320 is illustrated having variable wall thickness in which a predominant portion of the tube has a constant smaller wall thickness and a smaller portion of the tube has a larger wall thickness. In keeping with the above practice, items similar to those discussed in earlier embodiments will use the same two-digit reference numeral with the addition of prefix "3" to distinguish one embodiment from the other.

Figure 4B:
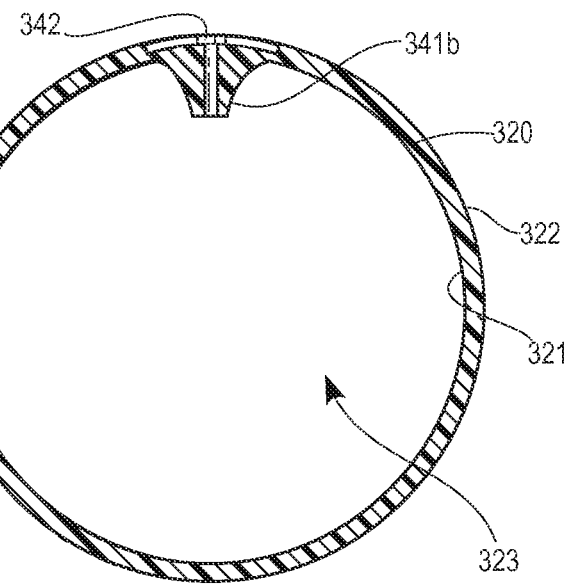
Figure 4C:
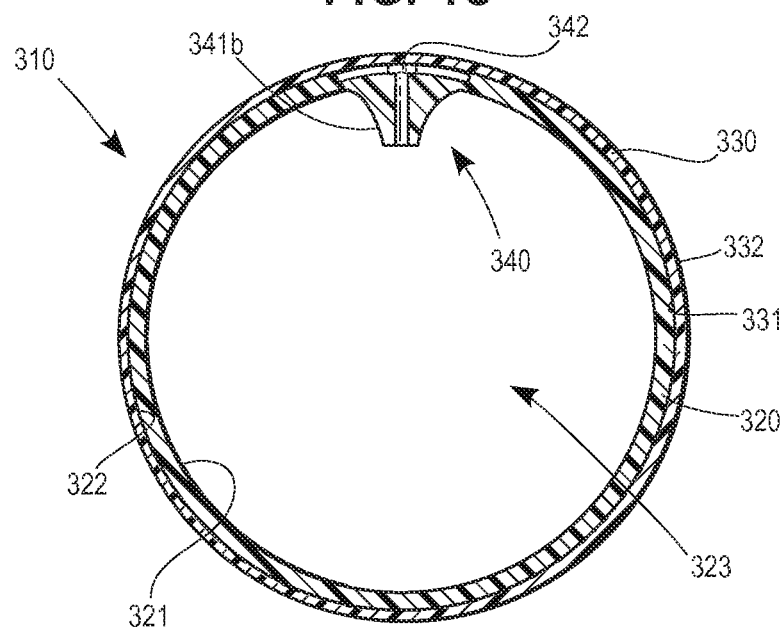

Once the emitter 340 is stamped or embossed into the outer surface 321 of tube 321 at the thickened wall portion, the tube 320 is left with a generally constant wall thickness as illustrated in FIG. 4B (with the exception of the emitter inlet portion 341b). Then the inner tube 320 is over-extruded with an outer tube 330 of constant wall thickness to enclose or seal the emitter 340 (e.g., emitter inlet 341, flow path 342 and outlet pool 343). In this way, a drip line 310 is provided with generally constant wall thickness with the exception of the inlet funnel 341b. It should be understood that in alternate embodiments, the inlet 341 does not need to extend into the lumen 323 of drip line 310 if desired. Rather, the inlet 341 could be shaped without a projecting portion or protrusion if it is preferred to keep the inner diameter of the inner tube 320 (and therefore drip line 310) constant throughout and to ensure that the emitter 340 has minimal (if any) negative effect (e.g., generation of turbulence, slowing of fluid flow, etc.) on the fluid flowing through lumen 323.

Figure 5:
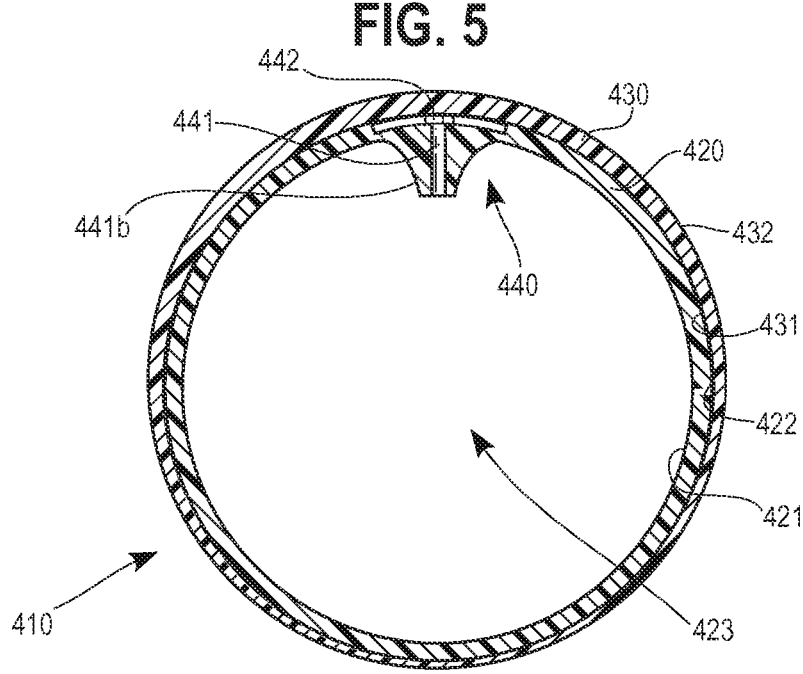
FIG. 5 illustrates a cross-sectional view of an alternate drip line and emitter embodying features of the present invention taken from the same perspective of FIGS. 3D and 4A-C, but illustrating an inner tube that has a generally constant thickness after the emitter is stamped therein and an outer tube that is thickened in the portion above the emitter but has reduced thickness elsewhere.

Yet another embodiment is illustrated in FIG. 5 in which the inner tube 420 is provided with constant wall thickness (whether it be from the start as with the embodiment of FIGS. 1A-E or after embossing as with the embodiment of FIGS. 4A-C) and an outer tube 430 is provided with variable wall thickness. In keeping with the above practice, items similar to those discussed in earlier embodiments will use the same two-digit reference numeral with the addition of prefix "4" to distinguish one embodiment from the other. In this form, the wall thickness of outer tube 430 is thickened near the emitter 440 to provide further structure support for the emitter 440 and/or reduce the risk of cracking or other fractures forming around the emitter 440 when the drip line 410 is manufactured and/or used (whether above ground or subsurface).

Figure 6:
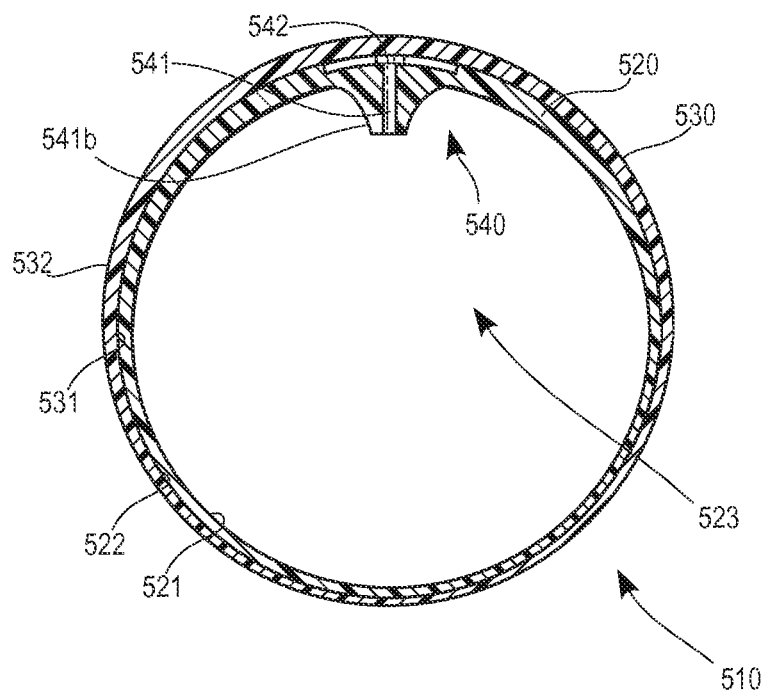
FIG. 6 illustrates a cross-sectional view of an alternate drip line and emitter embodying features of the present invention taken from the same perspective of FIGS. 3D, 4A-C and 5, but illustrating inner and outer tubes that are each thickened in the portion proximate the emitter and that have reduced thickness elsewhere.

Still another embodiment is illustrated in FIG. 6 in which both the inner tube 520 and outer tube 530 are provided with thickened wall portions located proximate the emitter 540. In keeping with the above practice, items similar to those discussed in earlier embodiments will use the same two-digit reference numeral with the addition of prefix "5" to distinguish one embodiment from the other. This should provide the benefits described above with respect to having a thickened inner tube wall 520 (e.g., more material to press the emitter into which gives greater options for height, width, length of emitter, etc.) and outer tube wall 530 (e.g., stronger more supported emitter, more resistant to cracking or other fracturing during manufacture and use of drip line including subsurface applications, etc.). In addition, it likely will make the emitter portion 540 (if not the entire drip line 510) capable of handling supply line fluids with higher pressures given the reinforcing provided by the thickened wall portions of tubes 520, 530 and/or may make the drip line 510 capable of withstanding greater amounts of force, such as when being buried further under ground and/or under heavily trafficked areas or areas exposed to greater forces of mass, etc.

One advantage to the embodiments discussed herein is that the finished tubing product "is" the emitter or drip line and no additional structures (e.g., in-line emitter bodies or multi-piece structures, on-line/branch emitters, etc.), need to be added to the tubing to create an emitter or drip line. Thus, the complicated and costly steps and materials required for assembling conventional emitters and drip lines can be avoided and replaced with a process for manufacturing or assembling tubing that is, itself, the emitter and/or drip line. In addition, the lack of additional structures (e.g., such as emitter bodies or barbed fittings extending into the lumen, etc.) and multi-piece structures (e.g., such as multi-piece emitter housings with elastomeric diaphragms, etc.), gives the emitter and drip line disclosed herein an improved grit tolerance or ability to avoid having the presence of grit interfere with the operation of the emitters of the drip line. For example, by removing the in-line emitter or barbed end of a branch emitter from the inner lumen of the drip line, grit cannot build-up on these structures and reduce fluid flow through the drip line or emitters. A burst pressure can further be applied to the emitter and drip line disclosed herein to flush grit more easily due to this simplified structure.

Figure 7:
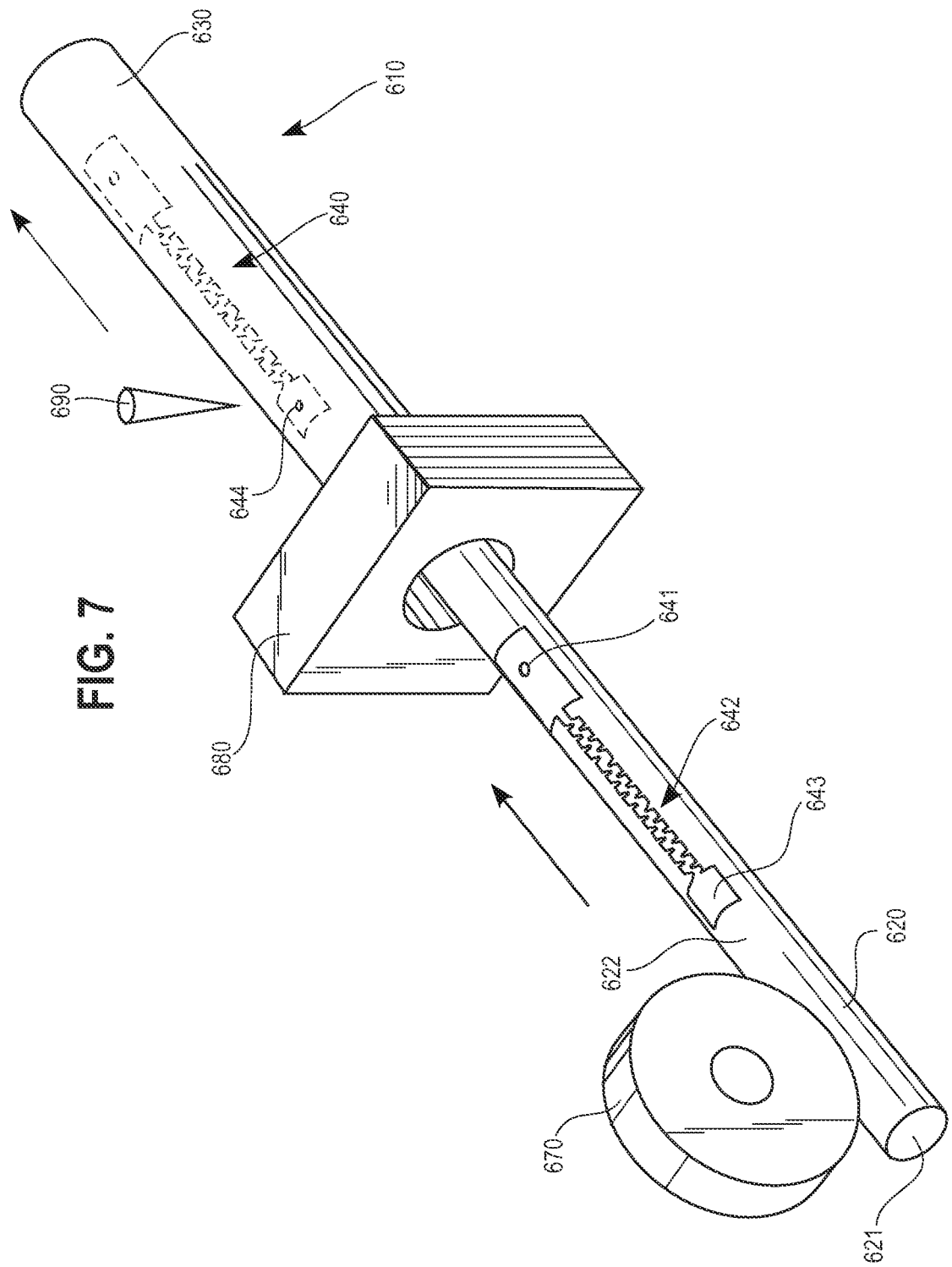
FIG. 7 illustrates a perspective view of a process for manufacturing drip lines and emitters in accordance with the invention disclosed herein and showing an extruded inner tube being embossed with the pressure reducing flow channel and then an outer tube extruded over the inner tube to form an enclosed or sealed emitter with an outlet opening punched through the outer tube to complete the emitter.

An exemplary setup for manufacturing the drip line disclosed herein is illustrated in FIG. 7. In keeping with the above practice, items similar to those discussed in earlier embodiments will use the same two-digit reference numeral with the addition of prefix "6" to distinguish one embodiment from the other. In this form, a plastic inner tube 620 is extruded using conventional extrusion processes and having an inside wall 621 and an outside wall 622. The inner tube 620 is then pressed, stamped or embossed via a molding structure, such as embossing wheel 670, to form an emitter inlet 643, pressure-reducing flow channel 642 and outlet pool or bath 643 in or on the exterior surface 622 of inner tube 620. As mentioned above, the inner tube 620 may be flattened or deformed as a result of the pressing/stamping/embossing stage and, thus, the tube 620 may have to be re-formed into a generally cylindrical tube. After this is done, the tube 620 is passed through a separate mold wherein an second outer tube 630 is extruded over the inner tube 620 thereby enclosing or sealing the inlet 641, flow channel 642 and outlet pool 643 of the emitter 640 so that all fluid flowing from inlet 641 to outlet pool 643 must flow through flow channel 642. Then a bore or hole 644 is punched through the outer tube 630 to complete the emitter 640 and provide an egress channel for fluid to flow out of the drip line 610 and to the surrounding environment in which the drip line 610 is placed.

Although the above identifies one exemplary method in which the drip line and emitter may be manufactured, it should be understood that many alternate methods of manufacturing such a drip line and/or emitter exist. For example, although the above description has primarily discussed the embossing of emitter parts on an outer surface of an inner tube, it should be understood that in alternate methods of manufacture the emitter and/or emitter parts may be created via a variety of different press or stamping methods, by etching or milling methods, etc. In addition, in other forms, the drip line and/or emitter may be manufactured by stamping an emitter design on an inside surface of a tube either as that tube is extruded over another tube to enclose the emitter portions or as another tube is extruded on the inside of that tube to enclose the emitter portions.

In yet another form, the drip line and/or emitter may be manufactured by stamping an inside surface of the tube to form a structure that extends out from the outer surface of the tube. For example, in the alternate form illustrated in FIG. 8 (which in keeping with the above practice uses the same two-digit reference numerals to identify items similar to those discussed above and adds prefix "7" to distinguish this embodiment from the others), a male die is positioned on the inner surface 721 of inner tube 720 and a corresponding female die is positioned on the outer surface 722 of the inner tube 720 to form baffle walls 742a, 742b extending upward or outward from the outer surface 722 of the inner tube 720. These walls 742a, 742b define a tortuous flow path or channel 742 that is then covered by an outer tube or jacket 730 extruded over the inner tube 720 to form an enclosed emitter 740. In a preferred form, the raised walls are of a sufficient height to create a pressure-reducing flow channel that is twenty thousandths of an inch to twenty-five thousandths of an inch (0.020" to 0.025") deep.

In addition to forming baffle walls 742a and 742b, the raised walls formed during the stamping or embossing process also form at least portions of inlet area 741 and outlet area 743 so that fluid flowing through the inner lumen 723 flows through the inlet 741 and flow channel 742 and exits the emitter 740 at outlet opening 744 which is formed in the outer tube or jacket 730 of the drip line 710 in a manner similar to that discussed above. Thus, in the form illustrated, neither the inlet 741 nor the outlet 743 extends into the inner lumen 723 of the drip line 710 and the floor of the flow channel 742 has the same outer diameter as the remainder of the inner tube 720 (with the exception of where the raised walls extend from the outer surface of tube 720).

Figure 8:
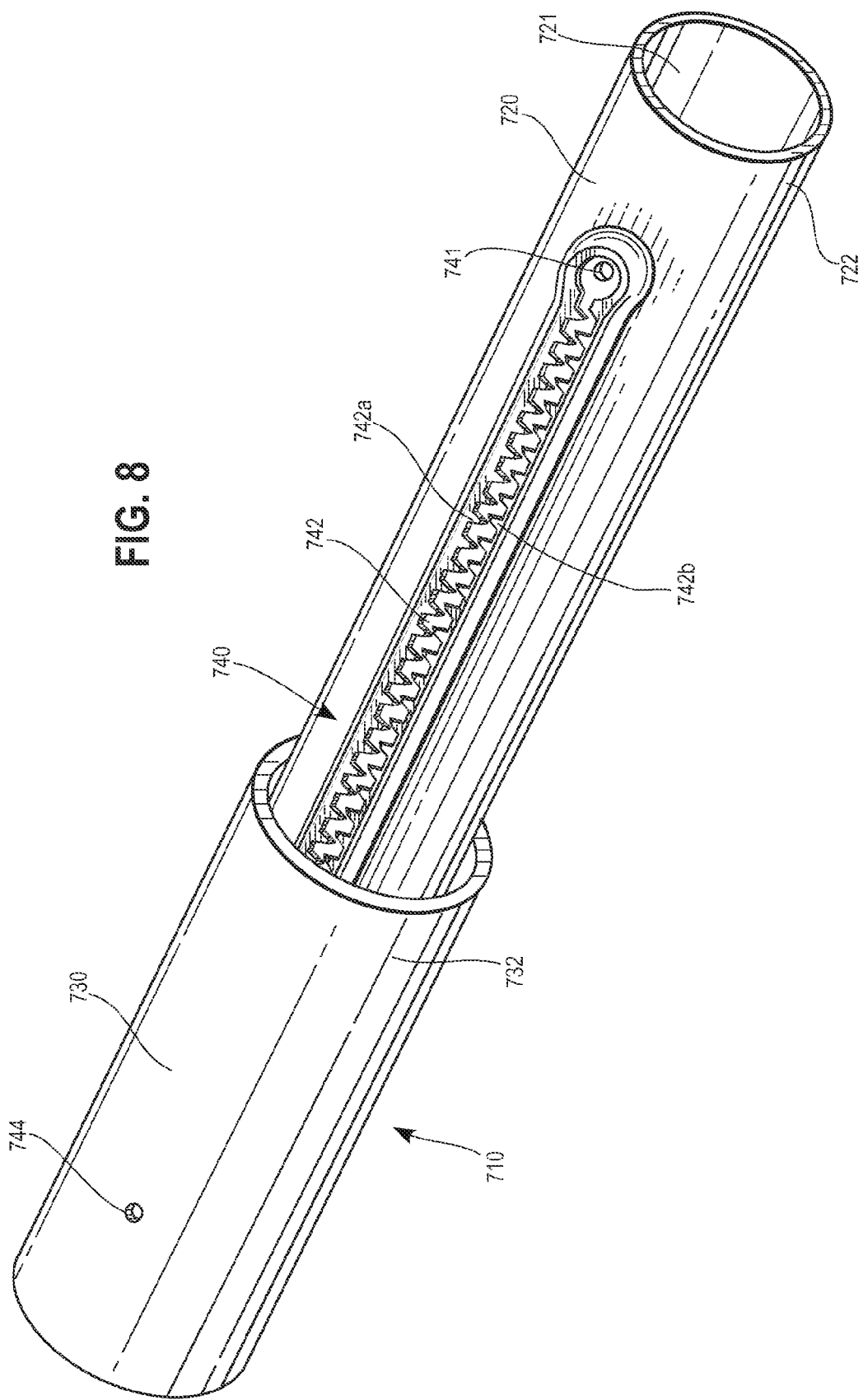
FIG. 8 illustrates a perspective view of an alternate drip line and emitter embodying features of the present invention in which the walls of the flow channel are stamped such that they extend out from the outer diameter of the first tube member to form a raised flow channel passage rather than having the flow channel stamped into the outer diameter of the first tube to form a recessed flow channel passage.

It should be understood, however, that in alternate embodiments, the raised walls do not have to form a perimeter wall defining at least a portion of the inlet area 741, outlet area 743 and pressure-reducing flow channel 742 (as depicted in FIG. 8), but rather may be used to define any one or more of these items and/or portions of these items. For example, in some forms a mixture of recessed areas and raised walls may be used to form the emitter 740. More particularly and as one example, the inlet area 741 and outlet area 743 in one form of emitter may be recessed into the exterior surface of the inner tube 720 (possibly even extending into the inner lumen 723 of tube 720 as discussed in above embodiments) while the pressure-reducing flow channel 742 is formed by raised walls extending between the inlet area 741 and outlet area 743. Transition areas may exist where the inlet and outlet areas connect to the pressure reducing flow channel to ensure that fluid flows between the inlet and outlet as desired and is not obstructed once the outer tube or jacket 730 is extruded over the inner tube 720. For example, portions of the flow channel adjacent the inlet and outlet areas might be recessed in these transition areas to ensure fluid flows through the emitter 740 as desired. Alternatively, portions of the inlet and outlet areas 741, 743 may be surrounded by raised walls, such as walls that taper in height, in these transition areas in order to ensure fluid flows through the emitter 740 as desired. In still other forms, a combination of recessed portions of flow channel 742 and raised walls near the inlet and/or outlet areas 741, 743 may be used in these transition areas in order to ensure fluid flows through the emitter 740 as desired.

In still other forms, at least a portion of one or more of the inlet area 741, pressure reducing flow channel 742 and outlet area 743 may be made up by a combination of raised and recessed portions separate and apart from the above mentioned transition areas (if such transition areas are even present). For example, the pressure-reducing flow channel 742 could be partially recessed in the exterior surface 722 of the inner tube 720 and partially formed by walls extending from the exterior surface 722 of the inner tube 720. Such a design would be particularly desirable in applications where a flow passage of maximum cross-section is desired without increasing the overall wall thickness of the drip line 710 (i.e., the combined thickness of both the inner and outer tubes 720, 730). Pressure compensating features like those discussed above could also be added if desired.

Furthermore, the thickness of the inner and outer tubes 720, 730 may be uniform or may vary in different embodiments. In one form, the outer tube 730 will be of uniform thickness and the inner tube 720 will be of variable thickness with the majority of the inner tube 720 having uniform thickness but the portion of the inner tube 720 into which the emitter 740 is to be stamped between the male and female dies being of greater thickness. In an alternate form, however, the inner tube 720 will be of uniform thickness and the outer tube 730 will be of variable thickness with the majority of the outer tube 730 being of uniform thickness and the portion of the outer tube 730 proximate the stamped emitter 740 being of greater thickness. While these are the preferred configurations for the forms of the emitter and/or drip line of FIG. 8, it should be understood that in other forms the tubes 720, 730 may both be of uniform thickness or both be of variable thickness as mentioned above with respect to prior embodiments. It should also be understood that, like the embodiments discussed above, the thickness of the tube walls will be selected such that it withstands the fluid pressures the emitter and drip line will be subject to for its indented application. Thus, if an inner tube with a thickened wall is required or an outer tube with a thickened wall is required (or some combination thereof) in order to withstand the fluid pressures that the drip line will be subject to (e.g., initial start-up fluid pressure, maximum service line fluid pressure, burst pressure or pressure of air used to winterize the line, etc.), then such thickened walls will be used.

One benefit to the configuration of FIG. 8 is that it allows the backside of the stamped structure to be used to form the emitter, which can often be cleaner than the front side or recessed side of the stamped structure (e.g., free of defects such as tears, sharp edges, dull or rounded edges, variations in edges, etc.) and/or can be more readily reproduced uniformly or without variance (e.g., reproduced in a repeatable fashion without much or any discrepancy from one version to another). For example, in some instances the walls of a stamped recess may vary from sharp edges to dull or rounded edges on the front side of the stamping, whereas the structure on the backside of the stamping is uniform and does not have walls or recesses that vary in shape, size, texture, etc. The ability to reproduce the emitters uniformly is desirable so that each emitter works the same and one does not drip more fluid than another on the same drip line.

Similarly, in yet other forms, an emitter may be formed on or in the inner or outer surface of a tube and then the tube may be pulled inside-out to put the emitter portions on either an outer or inner surface of the tube and then extruding another tube layer to enclose the emitter portions. In still other forms, a portion of the emitter may be injection molded and then inserted into the extruded drip line in order to form an enclosed emitter. For example, an elastomeric material may be injection molded and then inserted into a tube extrusion (e.g., bonded to an inner surface of the tube extrusion) in order to form an enclosed emitter with the features described herein.

Figure 9A:
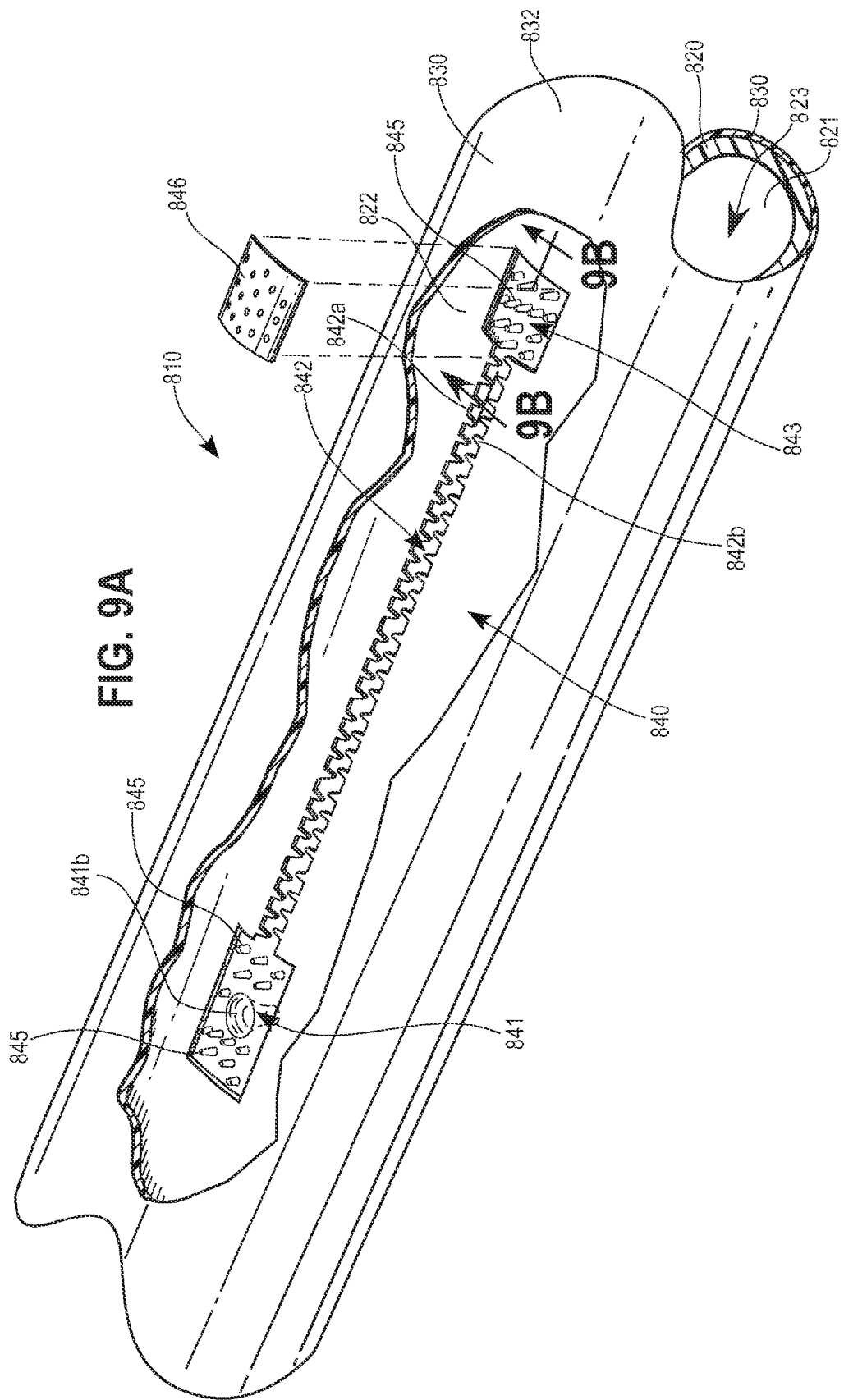

In FIGS. 9A-B, yet another drip line and emitter embodying features of the present invention are illustrated. In keeping with the above practice, items that are similar to those discussed above will be referenced using the same latter two-digit reference numeral and adding the prefix "8" just to distinguish embodiments. In the form shown, the drip line 810 includes a first conduit, such as inner tube 820, and a second conduit, such as outer tube 830, which are extruded coaxially with one another. The first tube 820 includes inner and outer surfaces 821, 822, respectively, and defines an inner lumen 823 through which fluid passes through the drip line 810. An emitter 840 is defined by the outer surface 822 of first tube 820 and outer tube 830 and includes an inlet 841, a pressure reducing flow passage, such as tortuous flow channel 842, an outlet bath or pool 843, and outlet 844. The outlet 844 is an opening defined by outer conduit 830 and may take a variety of different sizes or shapes. For example, in some applications it may be desirable to have generally round or circular opening. In other forms, an elongated slit or slot type opening may be preferred. In still other embodiments, an outlet plurality of openings may be preferred.

In a preferred form, the inlet 841 includes an elongated member, such as funnel 841*b*, that extends toward the center of the inner lumen 823 to draw fluid from closer to the center of the lumen 823 where less grit is present. The inlet 841, flow channel 842 and outlet bath 843 are preferably embossed or stamped into the outer surface 822 of the first tube 820. In one form, the first tube 820 may be made of an elastomeric material so that the floor of the flow channel 842 is capable of moving toward the inner surface 831 of outer tube 830 in response to increases in fluid pressure within inner lumen 823 in order to compensate for increases in fluid pressure. More particularly, as fluid pressure builds in inner lumen 823, the floor of flow channel 842 would move toward the inner surface 831 of outer tube 830, thereby decreasing the cross-sectional area of the flow channel 842 and reducing the amount of fluid that is allowed to pass through flow channel 842 so that the emitter 840 maintains a generally constant flow of fluid out of outlet 844. In such a form, the inlet 841 and outlet bath 843 may include protrusions, such as posts or nubs 845 to prevent the floor of the inlet 841 and outlet bath 843 from collapsing in toward the inner surface 831 of outer tube 830 as fluid pressure increases within inner lumen 823 so that fluid continues to flow into inlet 841 and pool at outlet bath 843. It should be understood, however, that the protrusions could take on a variety of different sizes and shapes in addition to or in place of posts 845. For example, in some forms, the protrusions may be in the form of walls or extensions extending from the surrounding side walls of the inlet 841 and outlet bath 843.

In some forms, the emitter 810 may also include a root growth inhibiting member, such as copper insert 846, which is positioned proximate to the outlet bath 843 to reduce the risk of roots growing into the outlet 844 of the emitter 840. In the form illustrated, the copper insert 846 corresponds in size and shape to the size and shape of outlet bath 843 and is, preferably, connected to the floor of the outlet bath 843 so that it cannot shift and block flow of fluid through the emitter 810 and out of the outlet 844. In one form, the copper insert 846 is formed as a plate that is fixed to the bottom of outlet bath 843 via an adhesive (e.g., glue, epoxy, resin, cement, etc.). In the form illustrated, the copper insert 846 has a generally rectangular shape that corresponds to the shape of outlet bath 843 and defines a plurality of openings that correspond in location to the protrusions 845 extending up from the floor of outlet bath 843. In a preferred form, the plurality of openings defined by copper insert 846 are sized so that the protrusion 845 easily fit therein so that the copper insert 846 can be placed directly against the floor of the outlet bath 843.

It should be understood, however, that in alternate embodiments, the copper insert 846 may take a variety of different shapes and sizes and may be connected or affixed to the emitter 810 in a variety of different ways. For example, with respect to size and shape, in alternate forms, the copper insert 846 may be shaped to fit in only a portion of the outlet bath 843 (e.g., filling only a portion of the outlet bath 843 rather than the entire floor of the outlet bath 843) and, thus, have a shape that does not correspond to the shape of the outlet bath 843. Thus, the copper insert 846 may be made round, rectangular or triangular (or of any other polygonal) shape, non-polygonal in shape, and may be symmetrical or asymmetrical in shape. For example, the copper insert 846 could be provided in a rectangular shape that defines a single opening to allow the insert 846 to be positioned on a single protrusion 845, or it may define a plurality of openings that allow the insert 846 to be positioned on a single row of protrusions 845, two rows of protrusions 845, etc.

With respect to connection to the emitter 810, the copper insert 846 may alternatively be affixed to the emitter 810 by way of another form of fastener besides adhesive, such as friction fit, tongue-and-groove (or mortise and tenon), screw, bolt, rivet, staple, hot weld, heat stake, pin, or other mating or interlocking structures, etc. For example, in one form, the openings defined by copper insert 8465 may be sized so that they create a friction or press fit engagement with protrusions 845. In yet another form, the protrusions 845 may be shaped with a section of reduced diameter near the floor of the outlet bath 843 so that the insert 846 is pressed down over the protrusion 845 until positioned within the reduced diameter section and held in place due to the adjacent protrusion portion being slightly larger in diameter than the opening defined by the insert 846 to prevent the inset 846 from lifting up from the floor of the outlet bath 843. In still other forms, it may be desired to position the copper insert 846 up off of the floor of the outlet bath 843 so that fluid flows over or along at least two sides of the insert 846. Thus, in one form, the openings defined by the copper insert 846 may be sized so that insert 846 cannot be positioned directly in contact with the floor of outlet bath 843. In other forms, the protrusions may have a reduced diameter section positioned somewhere between the floor of the outlet bath 843 and the distal end of the protrusion 845 to capture the insert 846 somewhere therebetween and spaced from both the floor and distal end. In embodiments where walls are used in place of posts for protrusions 845, the walls may define a notch, detent, groove or channel within which the copper insert 846 is positioned and maintained. Alternatively, the walls may define one or more, or even a continuous, rib or shoulder or set of ribs and shoulders within which the copper insert 846 is positioned and maintained. In still other forms, the insert 846 may not be fastened or affixed to the emitter and may simply rest in the outlet bath 843.

In other forms, the root inhibitor member 846 may be positioned in other locations about the emitter either in addition to the outlet bath 843 or in lieu of the outlet bath 843. For example, in some forms, the insert 846 may extend into the flow passage 842 and/or the inlet 841. In other forms, the root growth inhibitor member 846 will form a sleeve inserted into the outlet opening 844 through which fluid flows, such as a rivet or collar inserted in the opening 844. In still other forms, the root growth inhibitor 846 may be positioned on top of the outer surface 832 of outer tube 830 near the outlet opening 844.

In a preferred form, the outlet bath 843 of emitter 810 will take up no more than one third (⅓rd) of the emitter's total size from inlet 841 to outlet bath 843, thus, the copper insert 846 will preferably have a size that is less than one third (⅓rd) the overall emitter size (e.g., no more than ⅓rd the longitudinal length of the emitter from inlet 841 to outlet bath 843). In a preferred form, the copper insert 846 will also have a height that is less than fifty percent (50%) of the overall height of the outlet bath 843. In a preferred form, the height of the copper insert 846 will be equal or less than one third (⅓rd) the height of the outlet bath 843 to provide ample room for fluid to pool in outlet bath 843.

FIG. 10 is a perspective view of an alternate drip line and emitter embodying features of the present invention in which another root growth inhibiting member is disposed proximate the emitter to disrupt root growth that could interfere with the operation of the emitter. In keeping with above practices, items in this illustration that are similar to those discussed above will use the same latter two-digit reference numeral and add the prefix "9" to distinguish this embodiments from others. Thus, in the form illustrated, the drip line 910 includes a first, inner conduit 920, with a second, outer conduit 930 extruded coaxially over the first conduit 920. An emitter 940 is defined between the inner and outer conduits 920, 930, with the inner conduit 920 defining an emitter inlet 941 and the outer conduit 930 defining an emitter outlet 944. In the form shown, an inlet 941, pressure reducing flow passage 942 and outlet bath 943 are embossed or stamped in the outer surface 922 of inner conduit 920, with the inlet having a projecting or funnel portion 941b that extends toward the center of the inner lumen 923 defined by the inner conduit 920 to draw fluid from closer to the center of the inner lumen which contains less grit or other obstructions.

In a preferred form, the first conduit 920 is made of an elastomeric material to allow the floor of at least a portion of the flow channel 942 to collapse or reduce in cross-sectional area as fluid pressure increases within inner lumen 923 in order to allow the emitter 940 to be pressure compensating in addition to having pressure reduction properties via tortuous flow passage 942. In the form illustrated, the drip line 910 further includes protrusions 945 which prevent the floor of the inlet 941 and outlet bath 943 from collapsing under increases in fluid pressure within inner lumen 923. Unlike the previous illustrated embodiments, however, the protrusions 945 of outlet bath 943 are in the form of walls instead of posts, which extend from one or more of the surrounding side walls of the outlet bath 943. In the form shown, the protrusions 945 of outlet bath 943 extend from a side wall of the outlet bath 943 as fingers with distal ends terminating somewhere within the outlet bath 943.

The emitter 910 further includes a root growth inhibiting member, such as copper insert 946 disposed within the outlet bath 943. In the form shown, the copper insert 946 corresponds in shape to the shape of the outlet bath 943 so that the copper insert 946 may be disposed within the outlet bath 943 and, preferably, affixed to the floor of outlet bath 943. In this embodiment, the copper insert 946 is adhered to or bonded to the floor of the outlet bath 943 (e.g., the upper surface of the floor of the outlet bath, the side walls of the floor of the outlet bath, or both). It should be understood, however, that in alternate embodiments the root growth inhibitor member may take many different sizes or shapes and may be connected to the emitter in a variety of different ways, just like insert 846 of FIGS. 9A-B.

It should also be appreciated that any of the above-mentioned features with respect to each embodiment may be combined with one another to form alternate embodiments of the invention disclosed herein. For example, the root growth inhibiting member 846, 946 may be used with an emitter 810, 910 that is formed with first and second extruded tubes 820, 830 or 920, 930, (neither of which are made of an elastomeric material that would make the emitter pressure compensating), and the emitter 810, 910 does not include an inlet 841, 941 that projects toward the center of the inner lumen 823, 923. Alternatively, in other forms, the emitter may have a root growth inhibiting member 846, 946 and be made of first and second extruded tubes 820, 830 or 920, 930, (neither of which are made with an elastomeric material that would make the emitter pressure compensating), but that does include an inlet 841, 941 that projects toward the center of inner lumen 823, 923, such as by way of a funnel 841b, 941b. In still other forms, no root growth inhibiting member may be provided. In other forms, the inner and/or outer tubes 820, 830 and 920, 930 may have enlarged or thickened portions corresponding to where the emitter is formed like those discussed above with respect to prior embodiments. In still other forms, the inlet 841, 941, flow channel 842, 942 and outlet bath 843, 943 may be defined by a raised section, such as a wall, extending from the outer surface 822, 922 of the inner tube 820, 920 instead of being pressed down into the surface 822, 922 as illustrated in FIGS. 9A-10, similar to the embodiment of FIG. 8 discussed above. In other forms, the emitter 810, 910 may be formed via a combination of raised walls extending from surface 822, 922 and depressed portions pressed into the surface 822, 922.

In addition to the above embodiments, numerous methods are also disclosed herein. For example, one method of manufacturing a drip line disclosed herein comprises extruding a first tube layer having inner and outer surfaces and defining an inner lumen through which fluid may flow, embossing a plurality of inlets and pressure-reducing flow channels having first and second ends on an exterior surface of the first extruded tube layer, with each inlet being located at the first end of a corresponding pressure-reducing flow channel and the plurality of inlets opening on one end to the inner lumen defined by the inner surface of the first extruded tube layer and on an opposite end to the first end of the corresponding pressure-reducing flow channel, and sized to receive pressurized fluid from the inner lumen, extruding a second tube layer over the first tube layer to enclose the plurality of inlets and flow channels, and making outlet openings in the second extruded tube layer near the second end of each pressure-reducing flow channel so that the flow channel extends between the inlet and outlet for reducing the pressure and flow of fluid received at the inlet and discharged through the outlet.

In one form the first tube layer has a variable wall thickness, with a first thickened wall portion and a second thinner wall portion, and embossing the plurality of inlets and pressure-reducing flow channels comprises embossing the plurality of inlets and pressure-reducing flow channels into the first thickened portion of the first extruded tube layer. As mentioned above, the method of embossing the inlets and flow channels into the first tube layer may be selected from a variety of different methods. In a preferred form, the embossing step comprises pressing the inlet opening into the outer surface of the first extruded tube layer to form an inlet that projects into the inner lumen of the first extruded tube layer so that the fluid received at the inlet comes from a region other than at a circumferential periphery of the lumen adjacent the inner surface of the first tube in order to avoid grit and other particulates that are typically found near the inner surface of the first tube.

In addition to the above embodiments and methods, it should be understood that various methods of assembling irrigation drip lines, methods of compensating for pressure in a supply line (e.g., increases or decreases in supply line fluid pressure), methods of manufacturing an emitter and methods of reducing fluid flow pressure are also disclosed herein. For example, there is disclosed herein several methods of compensating for pressure fluctuations in supply line fluid pressure in irrigation drip lines and emitters. In one form, a method is disclosed comprising providing an emitter and/or drip line in accordance with those discussed above and including a method of compensating for fluctuation of supply line fluid pressure by moving the inlet between a first position wherein the inlet has a large cross-section and allows in a large amount of fluid, and a second position wherein the inlet has a smaller cross-section and allows in less fluid.

In another example, a method of compensating for fluid is disclosed comprising providing an emitter and/or drip line in accordance with those discussed above and compensating for fluctuation of supply line fluid pressure by moving at least a portion of the first tube between a first position wherein the at least a portion of first tube is spaced apart from the closest portion of the second tube by a first amount and a second position wherein the at least a portion of the first tube is spaced apart from the closest portion of the second tube by a second amount smaller than the first amount to compensate for an increase in fluid pressure. The at least a portion of the first tube may include individually and/or any combination of the floor of the flow channel, at least a portion of the floor of the inlet and/or at least a portion of the floor of the outlet pool.

In yet another example, a method of compensating for fluid is disclosed comprising providing an emitter and/or drip line in accordance with those discussed above and compensating for fluctuation of supply line fluid pressure by moving a tapered structure between a first position wherein the tapered structure is not in engagement with an inner surface of the second extruded tube and fluid is allowed to flow over the tapered structure and a second position wherein the tapered structure is in at least partial engagement with the inner surface of the second extruded tube so that fluid does not flow over the portion of the tapered structure that is in engagement with the inner surface of the second extruded tube and the cross-section of the flow channel is reduced and/or the length of the flow channel is lengthened.

In another form, a method is disclosed for manufacturing an emitter and/or drip line comprising extruding an inner tube, applying a male die to the inside surface of the inner tube and a corresponding female die to the outside surface of the inner tube in alignment with the male die to form a raised structure, such as one or more of the inlet area, flow passage or outlet area (or portions thereof), extending from the outer surface or outside surface of the inner tube and then extruding an outer tube or jacket over the inner tube to enclose the raised structure to form an emitter having an inlet open to the inner lumen of the tube and an outlet opening through the outer tube, with the flow passage extending between the inlet and outlet. The female die side of the inner tube being used to form the flow channel of the emitter rather than the male die side of the inner tube in order to provide a cleaner structure that can be more readily and uniformly reproduced from emitter to emitter.

An opening may have to be made in the outer extruded jacket or tube to form the outlet bore or opening (as discussed in above embodiments) in order to complete the emitter so that water can flow from the inner lumen, through the inlet, through the pressure-reducing flow channel and then out the outlet of the emitter. In the form illustrated, the inner and outer tubes will be at least partially flattened when the male and female dies are pressed or stamped to form the emitter structure and/or when the outlet opening is made in the outer jacket or tube. Thus, the method may further include re-rounding the at least partially flattened tubes into a rounded drip line having multiple emitters spaced along the drip line at a predetermined or desired interval (e.g., uniformly spaced, non-uniformly spaced, staggered, etc.). In a preferred form, the emitters will be located along a straight line uniformly spaced apart from one another. However, in alternate forms, the tubes may be rotated during the manufacturing process in order to stager the emitters so that they are not all located in a straight line if desired.

In another form, a method is disclosed for manufacturing a drip line disclosed comprising extruding a first tube layer having inner and outer surfaces and defining an inner lumen through which fluid may flow, embossing a plurality of inlets and pressure-reducing flow channels having first and second ends on an exterior surface of the first extruded tube layer, with each inlet being located at the first end of a corresponding pressure-reducing flow channel and the plurality of inlets opening on one end to the inner lumen defined by the inner surface of the first extruded tube layer and on an opposite end to the first end of the corresponding pressure-reducing flow channel, and sized to receive pressurized fluid from the inner lumen, attaching a root growth inhibiting member to the emitter, and extruding a second tube layer over the first tube layer to enclose the plurality of inlets and flow channels, and making outlet openings in the second extruded tube layer near the second end of each pressure-reducing flow channel so that the flow channel extends between the inlet and outlet for reducing the pressure and flow of fluid received at the inlet and discharged through the outlet. In some forms, attaching the root growth inhibiting member may occur prior to extruding the second tube. In other forms, attaching the root growth inhibiting member may occur after extruding the second tube. In addition, attaching the root growth inhibiting member may include fastening or securing the inhibiting member to a portion of the emitter. In alternate forms, attaching the root growth inhibiting member may simply comprise inserting or resting the root growth inhibitor somewhere within the emitter or adjacent the emitter inlet or outlet.

In the above examples, it should be clear that movement of movable structures (e.g., inlet dome, flow channel floor, inlet floor, outlet pool floor, tapered baffle portions, etc.) to compensate for fluid pressure increases and decreases can either be complete movements from a first limit of travel to a second limit of travel (i.e., from a furthest most open position to a furthest most closed position and vice versa), or alternatively, may simply be movements toward one or more of those limits of travel without those limits actually having been reached (i.e., movement toward a furthest most open position to a furthest most closed position and vice versa). In addition, the material chosen for the movable bodies may be selected such that such movement happens at a desired pace. For example, if a quick opening and closing is desired, a material that is more flexible or has a lower Durometer value may be selected. Whereas, if a slower or more gradual opening and closing (or transitioning from one or the other) is desired, a material that is less flexible or that has a higher Durometer value may be selected. Similarly, support structure such as lattice framework, internal ribs, exoskeletons, endoskeletons, etc. may be added to help assist in making such movement at the desired pace. Furthermore, as mentioned above, in a preferred form the emitter and/or drip line will not include pressure compensating features and will simply comprise a non-pressure compensating emitter and/or drip line capable of being produced more easily than conventional emitters and drip lines.

In addition to the above embodiments and methods it should be understood that these embodiments and methods may be used to produce emitters and drip lines that allow fluid to flow at different rates for different applications. For example, smaller or larger flow channel cross-sections may be provided, longer and shorter flow channels may be used, materials with different Durometer readings may be used, etc. In order to distinguish these product lines, color may also be added to the embodiments and methods of manufacturing same to distinguish one product line from another. For example, one color may be used to identify an emitter or dip line that drips at a rate of one gallon per hour (1 GPH), another color may be used to identify an emitter or drip line that drips at a rate of two gallons per hour (2 GPH), another color may be used to identify an emitter or drip line that drips at four gallons per hour (4 GPH). In addition some colors may be used to signify the source of water for a particular application. For example, the color purple is often used to indicate that reclaimed or recycled water is being used. If desired, any of the above embodiments and methods could include the addition of color for such purposes.

Many different embodiments and methods have been provided herein, however, it should be understood that these are not exhaustive and that many more alternate embodiments and methods in accordance with the disclosure set forth herein are contemplated in the appended claims. For example, of the numerous different concepts discussed, it should be understood that alternate embodiments are contemplated that utilize any one of these concepts on their own or combine, mix or match any number of these concepts in different ways.

Thus it is apparent that there has been provided, in accordance with the invention, a drip line and/or emitter and methods relating to same that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An irrigation drip emitter, comprising:
a first extruded tube layer defining an inlet, an outlet bath and a pressure-reducing flow channel extending between the inlet and outlet bath on an exterior surface thereof with the inlet and flow channel each having first and second ends and the second end of the inlet being connected to the first end of the flow channel, and the first end of the inlet opening to an inner lumen defined by an inner surface of the first tube layer, wherein the inlet defined by the first tube layer comprises an elongated bore formed by a protruding wall extending about a perimeter of the second inlet end and from the first end of the flow channel only so that the first inlet end extends into the inner lumen;
a copper insert positioned in or connected to the outlet bath; and
a second tube layer extruded over the first tube layer and the copper insert and enclosing the inlet and flow channel, the second tube layer defining an outlet in fluid communication with the outlet bath and the second end of the flow channel so that the flow channel extends between the inlet and outlet to create an emitter for converting a fluid flowing at a high flow rate in the inner lumen and at the first end of the inlet to a fluid with a low flow rate at the outlet of the emitter.

2. The irrigation drip emitter according to claim 1 wherein the copper insert is coupled to the first extruded tube layer.

3. The irrigation drip emitter according to claim 2 wherein the outlet bath includes a floor and the copper insert is secured to the floor of the outlet bath.

4. The irrigation drip emitter of claim 2 wherein the copper insert is fastened to a floor of the outlet bath of the emitter via at least one of an adhesive, screw, bolt, rivet, staple, hot weld, heat stake, pin, friction or press fit, tongue-and-groove, or mating or interlocking structures.

5. An irrigation drip emitter according to claim 1 wherein the pressure-reducing flow channel is a tortuous flow channel and the protruding wall that forms the elongated bore is a tapered annular wall that defines the emitter inlet and increases in diameter from the first inlet end to the second inlet end and assists in reducing fluid flow rate.

6. An irrigation drip emitter according to claim 1 wherein the first extruded tube layer is made of an elastomeric material capable of deflecting into the pressure-reducing flow channel in response to an increase in pressure of the fluid traveling through the inner lumen thereby reducing a cross-sectional area or volume of the flow channel as fluid pressure increases, and at least one of the inner and outer tube layers defines baffle walls that form at least a portion of the flow channel and the deflection of the elastomeric material into the flow channel further causes at least a portion of the baffle walls to move and lengthen the flow channel to compensate for increasing fluid pressure.

7. An irrigation drip emitter according to claim 6 wherein at least one of the first extruded tube and second tube layers define at least one stop or obstruction for preventing at least a portion of the inlet from completely collapsing in response to increasing fluid pressure.

8. An irrigation drip emitter according to claim 7 wherein the at least one stop or obstruction is a post extending from a surface of the at least one of the first extruded tube and second tube layers for preventing the at least a portion of the inlet from completely collapsing in response to increasing fluid pressure.

9. An irrigation drip emitter according to claim 1 wherein the first extruded tube layer is made of an elastomeric material capable of deflecting into the pressure-reducing flow channel in response to an increase in pressure of the fluid traveling through the inner lumen thereby reducing the cross-sectional area of the flow channel as fluid pressure increases, and the first extruded tube layer further defines ribs positioned proximate to the inlet for allowing the inlet to partially, but not completely, collapse in response to increasing fluid pressure in order to compensate for fluctuations in fluid pressure.

10. An irrigation drip emitter according to claim 1 wherein the pressure-reducing flow channel defined by the first extruded tube layer is recessed into the exterior surface of the first extruded tube layer.

11. An irrigation drip emitter according to claim 1 wherein the pressure-reducing flow channel defined by the first extruded tube layer is formed by a wall extending from the exterior surface of the first extruded tube layer.

12. An irrigation drip emitter according to claim 1 wherein at least a first portion of the inlet or pressure-reducing flow channel is recessed into the exterior surface of the first extruded tube layer and at least a second portion of the inlet or pressure-reducing flow channel is formed by a wall extending from the exterior surface of the first extruded tube layer.

13. An irrigation drip line comprising:
a first extruded tube layer defining a plurality of inlets, outlet baths and pressure-reducing flow channels extending between each inlet and outlet bath on an exterior surface thereof with each pressure-reducing flow channel being located proximate to one of the plurality of inlets, the plurality of inlets opening to an inner lumen defined by an inner surface of the first tube layer and sized to receive pressurized fluid from the inner lumen wherein each of the plurality of inlets defined by the first tube layer include an elongated bore formed by a protruding wall extending about a perimeter of the inlet, the bore extending from one end of the pressure-reducing flow channel on one end of the elongated bore and having an opposite distal end extending into the inner lumen to draw the pressurized fluid from a region other than at a circumferential periphery of the lumen adjacent an inner surface of the first extruded tube;
a plurality of copper inserts, each copper insert positioned in or connected to the plurality of outlet baths to deter roots from obstructing the flow of fluid through the emitter;
a second tube layer extruded over the first tube layer and plurality of copper inserts, and enclosing the plurality of inlets, outlet baths and flow channels, the second tube layer defining a plurality of outlets with each outlet positioned adjacent to one of the proximate outlet baths and flow channels on an end of the flow channel opposite one of the plurality of inlets so that the flow channel extends between one of the plurality of inlets and one of the plurality of outlets to create an emitter for reducing the pressure and flow of the pressurized fluid received at the plurality of inlets by the time the fluid is discharged through the plurality of outlets.

14. An irrigation drip emitter according to claim 13 wherein each pressure reducing flow passage is a tortuous flow passage and the protruding wall that forms the elongated bore of each inlet forms a tapered annular wall that defines the elongated bore of each emitter inlet and increases in diameter from the distal end to the one end of the bore located proximate the pressure-reducing flow channel that assists in pressure reduction.

15. An irrigation drip emitter according to claim 14 wherein the first extruded tube layer defines a floor and opposing side walls for each of the pressure-reducing flow channels with the side walls further defining a height of the pressure-reducing flow channels when the second tube layer is extruded over the first extruded tube layer.

16. An irrigation drip emitter according to claim 1 wherein the first extruded tube layer defines a floor of the pressure-reducing flow channel and upstanding walls extending from the floor and forming a perimeter wall of the pressure-reducing flow channel with the side walls further defining a height of the pressure-reducing flow channel when enclosed by the second tube layer.

17. An irrigation drip emitter according to claim 1 wherein the second tube layer has a smooth exterior surface except for the outlet opening defined therein.

18. An irrigation drip emitter according to claim 1 wherein the first extruded tube layer has a smooth inner surface except for the elongated bore formed by the protruding wall extending about the perimeter of the second inlet end.

19. An irrigation drip emitter according to claim 1 wherein the first extruded tube layer has an smooth inner surface except for the elongated bore formed by the protruding wall extending about the perimeter of the second inlet end and the second tube layer has an smooth exterior surface except for the outlet opening defined therein.

20. An irrigation drip emitter according to claim 1 wherein the first extruded tube layer is made of an elastomeric material capable of deflecting into the pressure-reducing flow channel in response to an increase in pressure of the pressurized fluid traveling through the inner lumen thereby reducing the cross-sectional area or volume of the flow channel as fluid pressure increases, and the outlet bath includes at least one projection for preventing the outlet bath from collapsing in response to increases in fluid pressure within the inner lumen and the copper insert defining a corresponding at least one opening for accommodating the at least one projection so that the copper insert can be disposed in the outlet bath of the emitter.

21. An irrigation drip line according to claim 13 wherein the first extruded tube layer is made of an elastomeric material capable of deflecting into the pressure-reducing flow channels in response to an increase in pressure of the pressurized fluid traveling through the inner lumen thereby reducing the cross-sectional area or volume of the flow channels as fluid pressure increases, and each outlet bath includes at least one projection for preventing each outlet bath from collapsing in response to increases in fluid pressure within the inner lumen and each copper insert defines a corresponding at least one opening for accommodating the at least one projection of each outlet bath so that the copper inserts can be disposed in the outlet baths of the emitter.

22. The irrigation drip emitter according to claim 2 wherein the first extruded tube layer defines the outlet bath and the copper insert corresponds in shape with at least a portion of the outlet bath to allow the insert to be disposed within the outlet bath of the emitter.

23. The irrigation drip emitter according to claim 2 wherein the outlet of the emitter includes an outlet bath and outlet opening and the copper insert is fastened to the outlet of the emitter.

24. The irrigation drip emitter according to claim 1 wherein the first extruded tube layer is made of an elastomeric material capable of deflecting into the flow channel in response to an increase in pressure of the fluid traveling through the inner lumen thereby reducing the cross-sectional area of the flow channel as fluid pressure increases.

25. The irrigation drip emitter according to claim 24 wherein the outlet bath includes at least one projection for preventing the outlet from collapsing in response to increases in fluid pressure within the inner lumen and the copper insert defines a corresponding opening for accommodating the at least one projection so that the copper insert can be disposed in the outlet bath of the emitter.

26. The irrigation drip line of claim 13 wherein each of the plurality of copper inserts is positioned in or connected to respective outlet baths of the plurality of outlet baths to deter roots from obstructing the flow of the pressurized fluid through each emitter, the outlet baths each having a shape or pattern and at least of portion of each copper insert designed to match a portion of the outlet bath shape or pattern to position the root growth inhibitor proximate the at least portion of the outlet bath in a desired arrangement with respect to the outlet.

* * * * *